US008080895B1

(12) United States Patent
Williams et al.

(10) Patent No.: US 8,080,895 B1
(45) Date of Patent: Dec. 20, 2011

(54) ENERGY GENERATION FROM COMPRESSED FLUIDS

(76) Inventors: Brian B. Williams, Santa Clara, CA (US); Thomas J. Burns, San Jose, CA (US)

( * ) Notice: Subject to any disclaimer, the term of this patent is extended or adjusted under 35 U.S.C. 154(b) by 672 days.

(21) Appl. No.: 12/189,535

(22) Filed: Aug. 11, 2008

Related U.S. Application Data

(60) Provisional application No. 61/124,821, filed on Oct. 12, 2007.

(51) Int. Cl.
| | |
|---|---|
| F03B 13/00 | (2006.01) |
| H02P 9/04 | (2006.01) |
| F03D 9/00 | (2006.01) |
| F02B 63/04 | (2006.01) |
| F03G 7/08 | (2006.01) |
| H02K 7/18 | (2006.01) |
| F01C 13/00 | (2006.01) |
| F01D 15/10 | (2006.01) |

(52) U.S. Cl. ............ 290/54; 290/1 R; 290/4 R; 290/44; 290/55; 60/398; 60/698

(58) Field of Classification Search .................. 290/1 R, 290/4 R, 44, 55, 54; 60/398, 698
See application file for complete search history.

(56) References Cited

U.S. PATENT DOCUMENTS

| | | | | | |
|---|---|---|---|---|---|
| 943,000 | A | * | 12/1909 | Busby | 60/398 |
| 1,299,151 | A | * | 4/1919 | Ebert | 416/23 |
| 1,522,437 | A | * | 1/1925 | Gommer | 416/197 R |
| 1,936,233 | A | * | 11/1933 | Groves | 415/4.3 |
| 2,333,614 | A | * | 11/1943 | Boyd | 417/229 |
| 2,433,896 | A | * | 1/1948 | Gay | 405/53 |
| 2,539,862 | A | * | 1/1951 | Rushing | 62/230 |
| 2,652,690 | A | * | 9/1953 | Labriola et al. | 60/418 |
| 3,151,250 | A | * | 9/1964 | Carlson | 290/52 |
| 3,478,444 | A | * | 11/1969 | Zemgals et al. | 434/126 |
| 3,677,351 | A | * | 7/1972 | Geissler | 173/198 |
| 3,776,265 | A | * | 12/1973 | O'Connor, Jr. | 137/487.5 |
| 3,806,733 | A | * | 4/1974 | Haanen | 290/55 |
| 3,944,855 | A | * | 3/1976 | Le Van | 310/69 |
| 3,967,132 | A | * | 6/1976 | Takamine | 290/4 R |
| 4,004,422 | A | * | 1/1977 | Le Van | 60/533 |
| 4,055,950 | A | * | 11/1977 | Grossman | 60/398 |
| 4,081,224 | A | * | 3/1978 | Krupp | 417/229 |
| 4,173,431 | A | * | 11/1979 | Smith | 417/229 |
| 4,206,608 | A | * | 6/1980 | Bell | 60/698 |
| 4,212,598 | A | * | 7/1980 | Roche et al. | 417/229 |
| 4,229,661 | A | * | 10/1980 | Mead et al. | 290/44 |
| 4,339,920 | A | * | 7/1982 | Le Van | 60/533 |
| 4,370,559 | A | * | 1/1983 | Langley, Jr. | 290/1 R |
| 4,392,062 | A | * | 7/1983 | Bervig | 290/54 |
| 4,409,489 | A | * | 10/1983 | Hayes | 290/1 R |
| 4,418,542 | A | * | 12/1983 | Ferrell | 60/668 |

(Continued)

*Primary Examiner* — Pedro J Cuevas
(74) *Attorney, Agent, or Firm* — Kevin Roe

(57) ABSTRACT

A method and system to use compressed fluids to generate electrical energy or an equivalent useful form of energy. A first embodiment uses pressurized air that can be stored to selectively and directly generate energy as required. A second embodiment uses a pressurized working fluid that can be stored to selectively and directly generate energy as required. A third embodiment uses at least one compressible floor module to compress at least one working fluid that can be stored to selectively and directly generate energy as required. The working fluid in various embodiments of the invention can be air, steam, oxygen, hydrogen, nitrogen, commercially available Freons, carbon dioxide, methane, ethane, propane, butane, various types of natural gas, ammonia, an equivalent type of gas, or an appropriate liquid.

30 Claims, 25 Drawing Sheets

U.S. PATENT DOCUMENTS

| | | | | |
|---|---|---|---|---|
| 4,437,015 A * | 3/1984 | Rosenblum | | 290/1 R |
| 4,447,738 A * | 5/1984 | Allison | | 290/44 |
| 4,467,217 A * | 8/1984 | Roussey | | 290/54 |
| 4,480,966 A * | 11/1984 | Smith | | 417/332 |
| 4,496,846 A * | 1/1985 | Parkins | | 290/44 |
| 4,496,847 A * | 1/1985 | Parkins | | 290/44 |
| 4,498,017 A * | 2/1985 | Parkins | | 290/44 |
| 4,525,631 A * | 6/1985 | Allison | | 290/4 R |
| 4,552,514 A * | 11/1985 | Hagen | | 417/332 |
| 4,555,307 A * | 11/1985 | Hagen | | 202/177 |
| 4,739,179 A * | 4/1988 | Stites | | 290/1 R |
| 4,950,130 A * | 8/1990 | Erlach | | 415/202 |
| 4,965,998 A * | 10/1990 | Estigoy et al. | | 60/325 |
| 5,084,630 A * | 1/1992 | Azimi | | 290/53 |
| 5,087,824 A * | 2/1992 | Nelson | | 290/1 A |
| 5,157,922 A * | 10/1992 | Baruch | | 60/325 |
| 5,280,208 A * | 1/1994 | Komura et al. | | 310/90 |
| 5,355,674 A * | 10/1994 | Rosenberg | | 60/325 |
| 5,489,765 A * | 2/1996 | Fezza | | 219/483 |
| 5,495,128 A * | 2/1996 | Brammeier | | 290/55 |
| 5,581,039 A * | 12/1996 | Yasutomi et al. | | 73/768 |
| 5,634,774 A * | 6/1997 | Angel et al. | | 417/229 |
| 5,842,838 A * | 12/1998 | Berg | | 417/331 |
| 5,975,865 A * | 11/1999 | Manabe | | 417/331 |
| 6,054,838 A * | 4/2000 | Tsatsis | | 320/101 |
| 6,091,159 A * | 7/2000 | Galich | | 290/1 R |
| 6,172,426 B1 * | 1/2001 | Galich | | 290/1 R |
| 6,204,568 B1 * | 3/2001 | Runner | | 290/1 R |
| 6,309,179 B1 * | 10/2001 | Holden | | 415/202 |
| 6,376,925 B1 * | 4/2002 | Galich | | 290/1 R |
| 6,443,697 B1 * | 9/2002 | Rossi et al. | | 415/202 |
| 6,559,553 B2 * | 5/2003 | Yumita et al. | | 290/54 |
| 6,734,575 B2 * | 5/2004 | Ricketts | | 290/1 R |
| 6,756,694 B2 * | 6/2004 | Ricketts | | 290/1 R |
| 6,927,503 B2 * | 8/2005 | Enis et al. | | 290/55 |
| 6,936,932 B2 * | 8/2005 | Kenney | | 290/1 R |
| 6,949,840 B2 * | 9/2005 | Ricketts | | 290/1 R |
| 7,023,104 B2 * | 4/2006 | Kobashikawa et al. | | 290/42 |
| 7,067,937 B2 * | 6/2006 | Enish et al. | | 290/55 |
| 7,086,231 B2 * | 8/2006 | Pinkerton | | 60/650 |
| 7,131,269 B2 * | 11/2006 | Koivusaari | | 60/495 |
| 7,155,912 B2 * | 1/2007 | Enis et al. | | 60/652 |
| 7,183,664 B2 * | 2/2007 | McClintic | | 290/55 |
| 7,250,691 B2 * | 7/2007 | Enis et al. | | 290/55 |
| 7,291,936 B1 * | 11/2007 | Robson | | 290/43 |
| 7,304,398 B1 * | 12/2007 | Kim et al. | | 290/1 E |
| 7,361,999 B2 * | 4/2008 | Yeh | | 290/1 R |
| 7,436,086 B2 * | 10/2008 | McClintic | | 290/55 |
| 7,629,698 B2 * | 12/2009 | Horianopoulos et al. | | 290/1 R |
| 7,638,889 B2 * | 12/2009 | Yeh | | 290/1 A |
| 7,719,127 B2 * | 5/2010 | Bertolotti | | 290/44 |
| 7,825,531 B2 * | 11/2010 | Tanaka et al. | | 290/54 |
| 7,843,076 B2 * | 11/2010 | Gogoana et al. | | 290/42 |
| 7,847,421 B2 * | 12/2010 | Gardner et al. | | 290/1 R |
| 7,900,444 B1 * | 3/2011 | McBride et al. | | 60/410 |
| 7,932,620 B2 * | 4/2011 | Plant, Jr. | | 290/55 |
| 7,963,110 B2 * | 6/2011 | Bollinger et al. | | 60/410 |
| 8,025,157 B2 * | 9/2011 | Takita et al. | | 210/416.2 |
| 8,032,976 B2 * | 10/2011 | Nelson | | 15/250.04 |
| 2001/0003247 A1 * | 6/2001 | Lundberg | | 60/648 |
| 2002/0041100 A1 * | 4/2002 | Yumita et al. | | 290/52 |
| 2002/0113442 A1 * | 8/2002 | Yumita | | 290/54 |
| 2002/0144504 A1 * | 10/2002 | Merswolke et al. | | 60/398 |
| 2003/0105556 A1 * | 6/2003 | Enis et al. | | 700/286 |
| 2003/0127861 A1 * | 7/2003 | Yumita et al. | | 290/43 |
| 2003/0132636 A1 * | 7/2003 | Ricketts | | 290/1 R |
| 2003/0132637 A1 * | 7/2003 | Ricketts | | 290/1 R |
| 2004/0130158 A1 * | 7/2004 | Kenney | | 290/1 R |
| 2005/0001430 A1 * | 1/2005 | Ricketts | | 290/1 R |
| 2005/0006903 A1 * | 1/2005 | Yumita et al. | | 290/43 |
| 2005/0138929 A1 * | 6/2005 | Enis et al. | | 60/641.8 |
| 2005/0200132 A1 * | 9/2005 | Kenney | | 290/1 R |
| 2005/0225091 A1 * | 10/2005 | Enis et al. | | 290/44 |
| 2006/0001267 A1 * | 1/2006 | Ricketts | | 290/1 R |
| 2006/0006653 A1 * | 1/2006 | Ricketts | | 290/1 R |
| 2006/0232895 A1 * | 10/2006 | Enis et al. | | 361/20 |
| 2007/0096469 A1 * | 5/2007 | Yeh | | 290/1 R |
| 2007/0246941 A1 * | 10/2007 | Tanaka et al. | | 290/1 R |
| 2008/0231056 A1 * | 9/2008 | Wen | | 290/54 |
| 2009/0021012 A1 * | 1/2009 | Stull et al. | | 290/44 |
| 2009/0033102 A1 * | 2/2009 | Enis et al. | | 290/4 R |
| 2009/0072545 A1 * | 3/2009 | Van Michaels | | 290/1 A |
| 2009/0078115 A1 * | 3/2009 | Mori | | 95/19 |
| 2009/0243303 A1 * | 10/2009 | Yeh | | 290/1 A |
| 2009/0309371 A1 * | 12/2009 | Ballard | | 290/1 R |
| 2010/0236230 A1 * | 9/2010 | Khymych | | 60/409 |
| 2011/0027069 A1 * | 2/2011 | Couto et al. | | 415/90 |
| 2011/0109094 A1 * | 5/2011 | Kenway et al. | | 290/55 |
| 2011/0156402 A1 * | 6/2011 | Khymych | | 290/55 |
| 2011/0181050 A1 * | 7/2011 | Dinu | | 290/1 R |
| 2011/0204655 A1 * | 8/2011 | Waibel | | 290/1 R |
| 2011/0250068 A1 * | 10/2011 | Haugen | | 416/1 |

* cited by examiner

ENERGY GENERATION FROM COMPRESSED FLUIDS

CROSS-REFERENCE TO RELATED APPLICATIONS

This application claims priority from a U.S. provisional patent application Ser. No. 61/124,821, filed Oct. 12, 2007, by the same inventors, entitled "Energy Generation From Compressed Fluids," which is hereby incorporated by reference.

BACKGROUND OF THE INVENTION

1. Field of the Invention

This invention relates to a method and system of generating energy from compressed fluids, and in particular, to providing a method and system to compress and store a fluid and create electrical energy or other types of useful energy.

2. Description of the Prior Art

While solar power may be the most widely known natural energy source, there is also the potential to obtain energy from moving air and other moving fluids. Windmills, for example, have been built in many areas of the country where the wind frequently blows. As the wind blows against the windmills, rotational power is created and then coupled through various types of transmissions to drive generators to generate electricity. This energy is often used to supplement energy produced by utility power plants.

One drawback to using wind as an energy source, however, is that the wind does not always consistently blow at the same speed, i.e., it is not always reliable and predictable. While attempts have been made in the past to store energy produced by wind so that it can be used during peak demand periods, and when little or no wind is blowing, these past systems have failed to be implemented in a commercially practical manner. Past attempts have also had difficulties in reducing the energy inefficiencies (e.g., energy losses in the mechanical transmissions to the electrical generators, and so forth) inherent in using wind as a source for energy on a continuous and uninterrupted basis.

Most populated areas of the country have adequate electrical power generating and back-up systems, such as those provided by local utility companies, and distributed by large electrical power grids. Locally generated electricity from alternative energy sources such as wind power and other types of moving fluids can be connected into these large electrical power grids for payment or later electricity exchange with conventional sources.

In some remote areas of the country, however, electrical power is not always readily available, and other efforts must be made to obtain the needed power. For example, people who live high up in the mountains, or people who live in areas that are remote from the nearest electrical power grid, often have difficulty obtaining power. The cost of running overhead or underground cables from the nearest electrical power grid to service these types of remote locations can be prohibitively high.

Notwithstanding these problems, because wind and other sources of moving fluids are a significant energy resource that will never disappear, there is a need to develop a system that can not only harness the power generated by wind and other sources of moving fluids to provide electrical power, but to do so in a practical manner, to enable these alternative forms of energy to be supplied even to remote locations on a continuous and uninterrupted basis, i.e., as a primary energy source, using means for storing the fluid energy in an effective manner so that it can be used efficiently during peak demand periods, even when little or no fluid energy is naturally available at the time of energy need.

In view of the foregoing, what is needed is an improved method and system to compress and store a fluid and create electrical energy or other types of useful energy with a very high energy conversion efficiency.

SUMMARY OF THE INVENTION

The present invention can be implemented in numerous ways, such as by a method or a system. Four aspects of the invention are described below.

A first aspect of the invention is directed to a method to produce power from the compression of a working fluid. The method includes converting the motion of a fluid into a rotational energy, wherein the rotational energy is coupled to a compressor module with at least one working fluid and a compressor to compress the at least one working fluid; compressing the at least one working fluid in the compressor module into a pressurized working fluid, wherein the pressurized working fluid is coupled to at least one storage module for storage of the pressurized working fluid; releasing a portion of the pressurized working fluid through at least one power module, wherein the at least one power module can generate a usable form of energy; and generating a usable form of energy from the at least one power module by a motion of the portion of the pressurized working fluid.

A second aspect of the invention is directed to a method to produce power from the compression of a working fluid. The method includes converting the motion of a fluid into a rotational energy, wherein the rotational energy is coupled to a compressor module with at least one working fluid and a compressor to compress the at least one working fluid; compressing the at least one working fluid in the compressor module into a pressurized working fluid, wherein the pressurized working fluid is coupled to at least one storage module for storage of the pressurized working fluid; releasing a portion of the pressurized working fluid through at least one power module, wherein the at least one power module can generate a usable form of energy; and generating a usable form of energy from the at least one power module by a motion of the portion of the pressurized working fluid.

A third aspect of the invention is directed to a system to produce power from the compression of a working fluid. The system includes a compressor module with at least one working fluid and a compressor to compress the at least one working fluid into a pressurized working fluid by utilizing the motion of a fluid; a storage module for storage of the pressurized working fluid produced by the compressor module; and a power module to generate a usable form of energy by releasing a portion of the pressurized working fluid through the at least one power module.

A fourth aspect of the invention is directed to a system to produce power from the compression of a working fluid. The system includes a compressor module with at least one working fluid and a compressor to compress the at least one working fluid into a pressurized working fluid by utilizing the motion of a fluid; a storage module for storage of the pressurized working fluid produced by the compressor module; and a power module to generate a usable form of energy by releasing a portion of the pressurized working fluid through the at least one power module.

These and other objects and advantages of the invention will become apparent to those skilled in the art from the following detailed description of the invention and the accompanying drawings.

DETAILED DESCRIPTION OF THE PREFERRED EMBODIMENT

Figure 1:
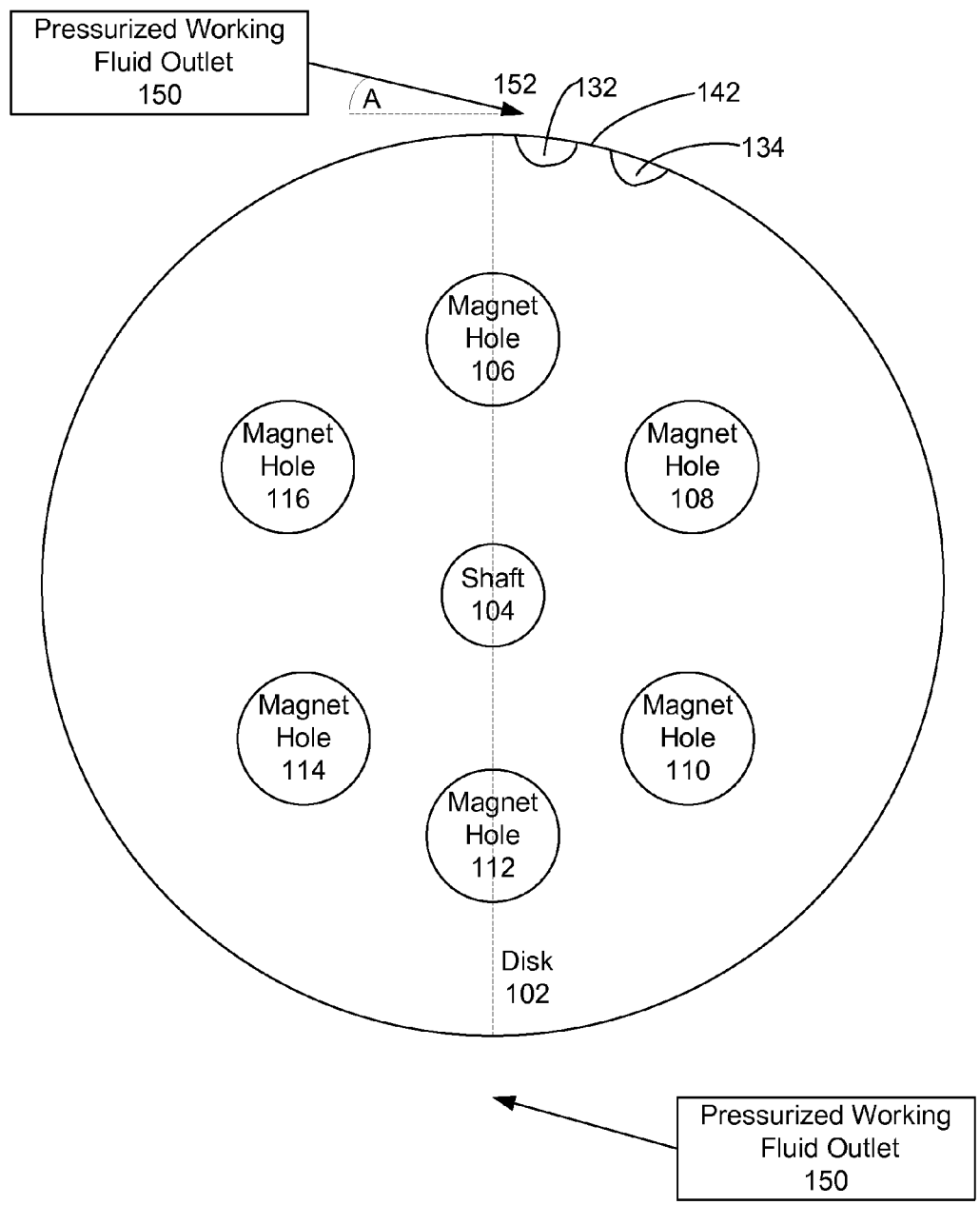
FIG. 1 illustrates a front view of a power module disk, in accordance with one embodiment of the invention.

Embodiments of the invention can be constructed from commercially available components. In all of the embodiments disclosed below, different materials could be used for fabricating the various modules (e.g., the turbines, and housings, and other components) including but not exclusively including: various plastics, rubbers, resins (e.g., phenolic resins and equivalents), fiber-reinforced polymers (e.g., using fibers of various compositions, such as glass, and equivalents), ceramics, and metals (e.g., aluminum alloys, such as 6061 aircraft aluminum, and equivalent metals and metal alloys). In the embodiments disclosed below, different materials could be used for the piping, including but not exclusively including: various plastics, rubbers, resins, fiber-reinforced polymers, ceramics, metals, metal alloys, or other equivalent manmade materials. Different types of generators or permanent magnets could be selectively utilized in a power module for energy generation, depending on the application, such as aluminum-nickel-cobalt (Alnico), and rare-earth magnets, such as samarium-cobalt, and neodymium-iron-boron (as known as NeFeB or NIB), strontium, iron oxide, or barium ferrite ceramic magnets, and equivalent high magnetic strength magnets. High magnetic strength plastic magnets could be used in an alternative embodiment. Such magnets are available from various commercial suppliers (e.g., McMaster Carr, with corporate headquarters in Atlanta, Ga.; Stanford Magnets Company, with corporate headquarters in Aliso Viejo, Calif.; K&J Magnetics, Inc., with corporate headquarters in Jamison, Pa.; and other suppliers).

The fluids and their utilization are explained in more detail below, and in some embodiments one fluid is used to operate a compressor module, and a second fluid is used as the working fluid to ultimately flow into the power module. Several possible materials could be utilized for the working fluid, including but not exclusively including: atmospheric air, steam, oxygen, hydrogen, nitrogen, various types of commercially available Freons, carbon dioxide ($CO_2$), methane, ethane, propane, butane, liquefied natural gas (LNG), ammonia, any mixture of the above, or other fluids that can be compressed. One embodiment of the invention uses the same fluid (e.g., air) for the fluid and the working fluid, and would typically release the working fluid to the atmosphere. Other embodiments of the invention that use a working fluid other than air would typically utilize a closed system to recycle the working fluid and avoid release of the working fluid to the atmosphere.

One embodiment of the invention provides a system for generating useful mechanical power, which can be used by itself to generate chemical energy or compress gases, or connected to one or more generators to produce either AC or DC electricity. Some embodiments of the invention provide apparatus or systems specifically useful for generating electricity to supply power for local use or connection into an electrical grid for distribution elsewhere.

Other terms used below are defined as follows. Windmill—a device to convert the kinetic energy of a moving fluid into a rotational energy of a relatively low RPM, which can be used to operate a compressor to compress a working fluid into a pressurized working fluid. Turbine—a device to convert the kinetic energy of a moving fluid or a moving working fluid into a rotational energy of a relatively high RPM, which can be used to operate a compressor to compress a working fluid into a pressurized working fluid, or used in other cases to operate a generator to generate power. Pressure regulator—a device to maintain a specific range of pressurized working fluid. Voltage regulator—a device to maintain a specific range of electrical voltage in an electrical circuit.

FIG. 1 illustrates a front view of a power module disk, in accordance with one embodiment of the invention. For clarity, FIG. 1 is not drawn to scale. This front view includes a flat disk 102, having a shaft 104 (or in an alternative embodiment a shaft hole for insertion of a shaft) for the later insertion of a bearing (not shown). The disk 102 also has a plurality of magnet holes 106, 108, 110, 112, 114, and 116 for the later placement of permanent magnets (not shown). The disk 102 also has a plurality of substantially semicircular grooves 132 and 134 and separations 142 fabricated along the entire circumference of the disk 102 (the substantially semicircular grooves 132 and 134 and separation 142 between the grooves 132 and 134 are shown greatly enlarged, and would be fabricated around substantially the entire circumference of the disk 102, but the semicircular grooves of the entire circumference of the disk are not shown for the sake of clarity). One or more pressurized working fluid outlets 150 (two are shown for clarity, but any number of such outlets can be used) provide a working fluid 152 with kinetic energy to rotate the disk 102. In one embodiment, the substantially semicircular arcs 132 and 134 would be major arcs (i.e., more than 180 degrees of arc) of circles or substantially circular ellipses. These substantially semicircular arcs 132 and 134 help improve the transfer of the kinetic energy of the working fluid 152 to the disk 102, and increase the rotational energy of the disk 102. In one embodiment of the invention, the substantially semicircular grooves 132 and 134 have a radius of approximately 0.025 inches (0.635 millimeter) and the separation 142 has a width of approximately 0.026 inches (0.66 millimeter). However, other embodiments of the invention can have either larger dimensions or smaller dimensions for the substantially semicircular grooves 132 and 134 and separation 142 between them. And other embodiments of the invention can use grooves that are major or minor circular arcs or other substantially circular shaped arcs fabricated on the circumference of the disk 102.

In one embodiment, the disk 102 is fabricated from an aluminum alloy (e.g., aircraft aluminum 6061, or an equivalent), but the disk 102 could alternatively be fabricated completely or partially from other materials capable of withstanding the mechanical forces created during operation (e.g., various fiber-reinforced polymers (e.g., using fibers of various compositions, such as carbon, glass or equivalents), ceramics, and other metals besides aluminum alloys, such as steel alloys). In one embodiment, the disk 102 could be fabricated from a solid flat disk having the holes 104, 106, 108, 110, 112, 114, and 116 drilled, or in an alternative embodiment the disk 102 could be molded (e.g., from a metal alloy or equivalent) with the holes 106, 108, 110, 112, 114, and 116 already placed. In one embodiment, the number of magnet holes could range from two or more holes, depending on the diameter of the disk 102, the diameter of the magnet holes, and the desired energy output from the disk. The placement of the magnet holes 106, 108, 110, 112, 114, and 116, closer or farther in radius from the shaft 104, would also affect the rotational velocity of the magnets (not shown). Although circular magnet holes are illustrated in this embodiment, alternative embodiments of the invention could use magnet holes having other polygon shapes (e.g., rectangles). The holes typically are chosen to substantially match the selected shapes of the magnets to be inserted in the holes. Various types of commercially available adhesives can be used to hold the magnets in the magnet holes, if necessary.

The disk 102, when fully assembled, would be set in rotational motion by the kinetic energy of a pressurized working fluid 152 released and directed from one or more pressurized working fluid outlets 150. In one embodiment of the invention, the angle of incidence between the tangent of the circumference of the disk 102 and the directed motion of the pressurized working fluid 152 is approximately 37 degrees to increase the efficiency of power transfer from the kinetic energy of the pressurized working fluid 152 to the disk 102. In other embodiments of the invention, other angles can be used. In one embodiment of the invention, the pressurized working fluid outlets 152 have an internal diameter equal to or greater than 0.040 inches (1 millimeter), and in various embodiments there are one to twelve pressurized working fluid outlets 152 evenly distributed around the circumference on the disk 102 to direct working fluid at the disk 102. Furthermore, the dimensions of the substantially semicircular grooves (for example, substantially semicircular grooves 132 and 134) and separations (for example, separation 142) on the circumference of the disk 102 can also be optimized to capture the kinetic energy of the working fluid 152. In one embodiment of the invention, the width of the separation 142 is substantially equal to the radius of the substantially semicircular grooves 132 and 134 on the circumference of the disk 102 to increase the efficiency of power transfer from the kinetic energy of the pressurized working fluid 152 to the disk 102. In other embodiments of the invention, other relative dimensions of the radii and separations can be used, and/or a plurality of radii and separations can be used around the circumference of the disk 102. The final steady state rotational velocity of the disk 102 will correspond to a high revolution per minute (RPM), typically ranging from 5,000 to 60,000 RPM in various embodiments, so ceramic bearings or air bearings (not shown) in shaft 104 should be selected to sustain the high RPM for reliable operation. In various embodiments, the diameter of the disk 102 typically ranges from 2 inches (5.08 centimeters) to 10 inches (25.4 centimeters), but the diameter of the disk 102 can be larger or smaller in other embodiments of the invention. In one embodiment of the invention, the thickness (width) of the circumference rim of the disk 102 is 1.5 inches (3.81 centimeters), but the thickness can be less or more than 1.5 inches in other embodiments. In one embodiment, the thickness of the disk 102 is not uniform and can be recessed or expanded compared to the thickness of the disk 102 at the circumference rim of the disk 102.

Figure 2:
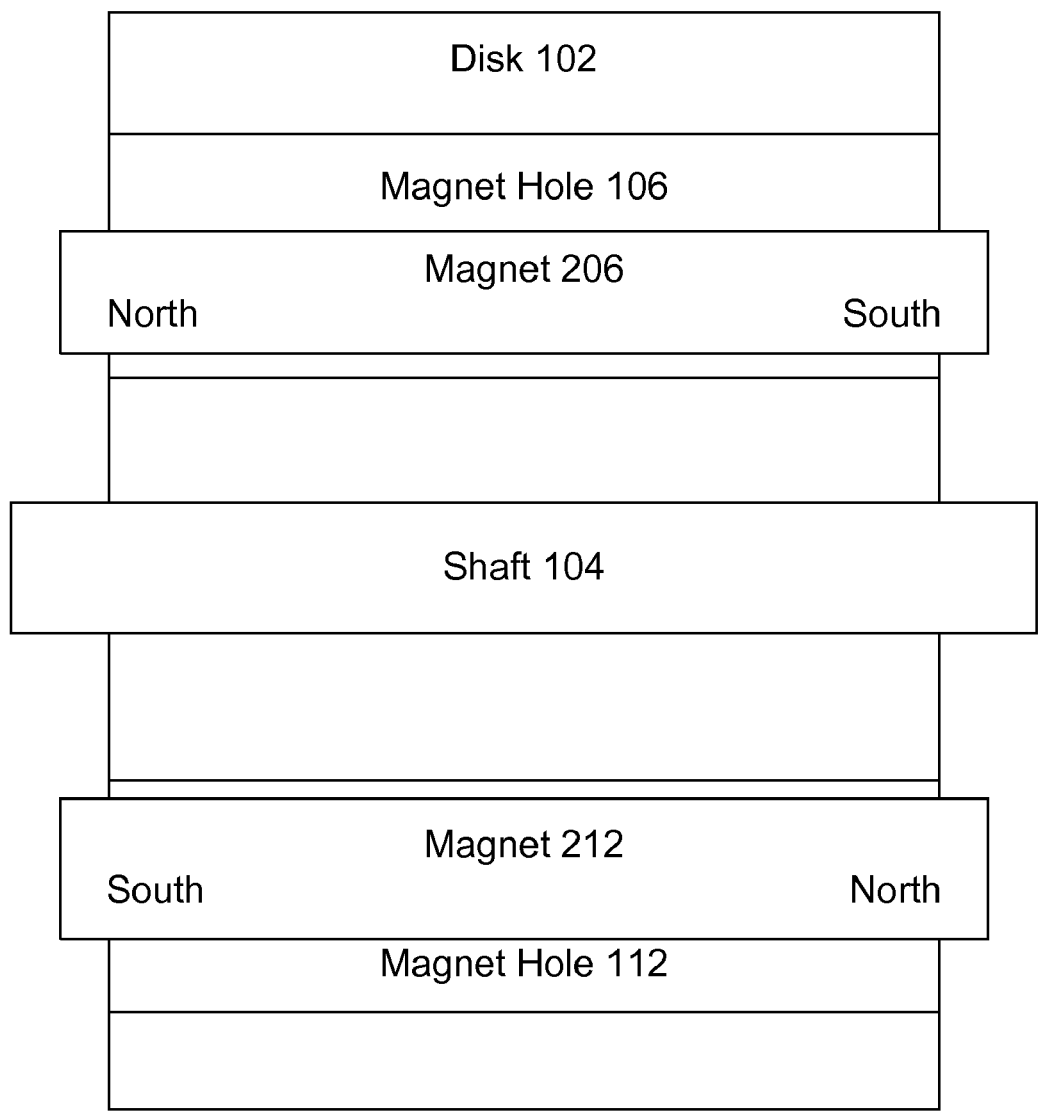
FIG. 2 illustrates a side cross-sectional view of a power module disk, in accordance with one embodiment of the invention.

FIG. 2 illustrates a side cross-sectional view of a power module disk, in accordance with one embodiment of the invention. For clarity, FIG. 2 is not drawn to scale. This view of disk 102 illustrates two of the magnet holes 106 and 112, with permanent magnets 202 and 204 inserted in the magnet holes 106 and 112, respectively. The diameters of the permanent magnets 202 and 204 would actually fit very tightly within the diameters of the magnet holes 106 and 112, but a looser fit is shown here only for clarity. In one embodiment, 16 pound (~7.25 kilograms) pull centered magnets with dimensions of 0.875 inch by 0.25 inch (~2.187 centimeter by 0.625 centimeter) would be used. Although cylindrical (i.e., rod) magnets are used in some embodiments, alternative embodiments of the invention can use block magnets having rectangular shapes, or even arbitrary polygon shapes. Shaft 104 is also shown and would need to have a diameter sufficient to accommodate a bearing (not shown). In one embodiment R26 ceramic bearings would be used, available from various commercial suppliers (e.g., US Bearings and Drives, with corporate headquarters in Vancouver, Wash.; Bartlett Bearing Corporation, with corporate headquarters in Philadelphia, Pa.; and other suppliers).

Figure 3:
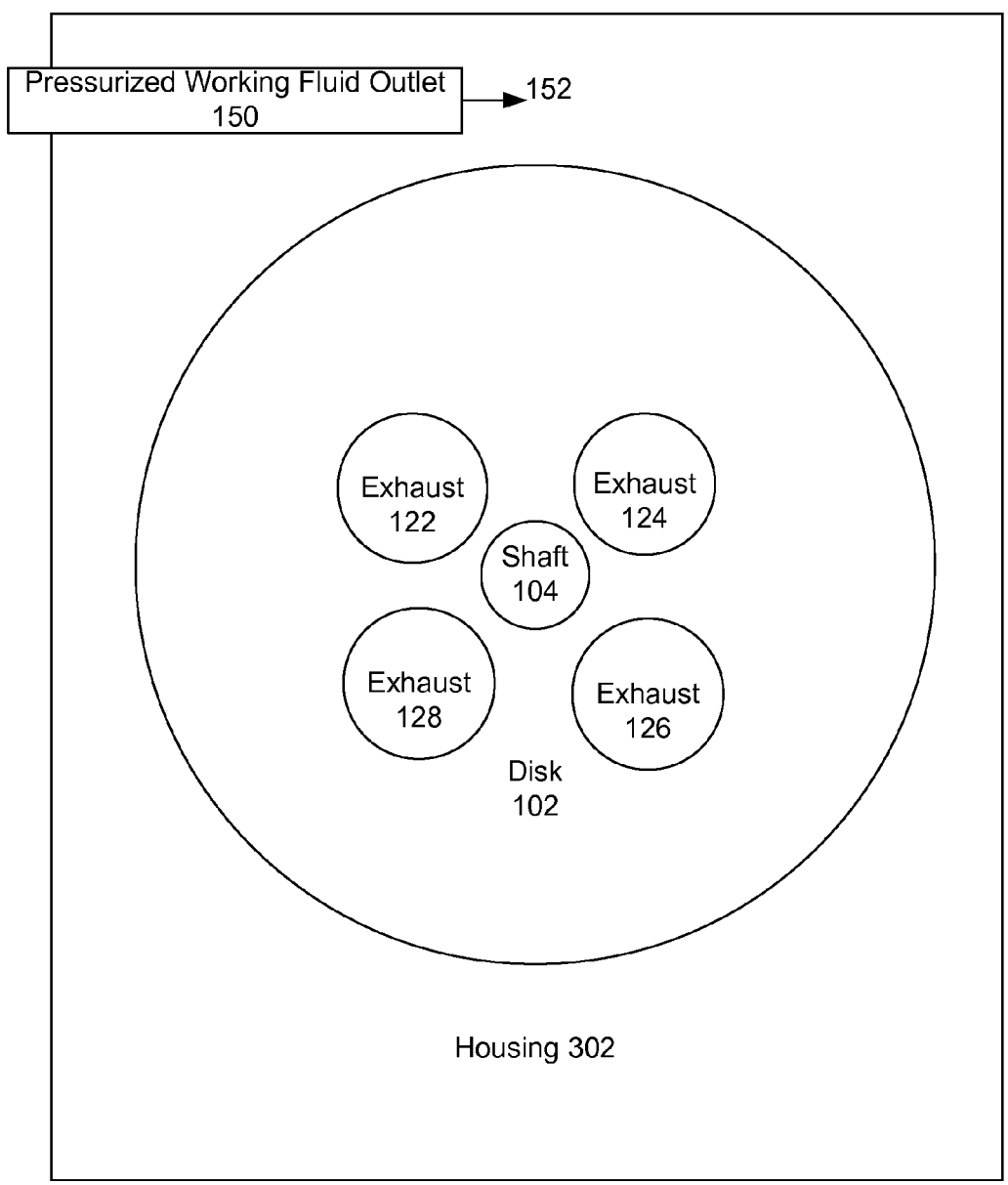
FIG. 3 illustrates a front view of a housing for a power module disk, in accordance with one embodiment of the invention.

FIG. 3 illustrates a front view of a housing for a power module disk, in accordance with one embodiment of the invention. For clarity, FIG. 3 is not drawn to scale. This front view includes an X-ray view of the housing 302, and shows a pressurized working fluid outlet 150 to provide pressurized working fluid 152 to the circumference of the disk 102 inside the housing 302. This view also shows the shaft 104 for the later insertion of a bearing (not shown). Exhaust holes 122, 124, 126 and 128 are also shown, and these would be used to route the pressurized working fluid after utilization to either a storage module (not shown) in a closed-loop system, or to atmosphere in the case of an open-loop system (e.g., using atmospheric air for the pressurized working fluid). The number of exhaust holes could be one, two, three, four or any number of exhaust holes, placed anywhere on the housing in various embodiments of the invention, as many and as large as necessary to completely the exhaust the working fluid after the energy is extracted. In one embodiment, the housing 302 is fabricated from one or more sheets of a polycarbonate resin, such as Lexan®, which is a material commercially available in sheets having a thickness typically ranging from 0.75 millimeter to 12 millimeters. In various embodiments, the thickness of the housing 302 would typically range from 5 millimeters to 25 millimeters. Lexan® is commercially available from General Electric Plastics, with corporate headquarters in Pittsfield, Mass. Alternative embodiments could be fabricated with one or more sheets of other strong, non-conducting materials, e.g., polymers such as polymethyl methacrylate (e.g., Plexiglas®, Lucite®, Perspex®) or an equivalent material. Such materials are commercially available from Professional Plastics, Inc., with corporate headquarters in Fullerton, Calif.; Lucite International Ltd., with corporate headquarters in Southampton, United Kingdom; Arkema, with corporate headquarters in Paris, France; and other suppliers.

Figure 4:
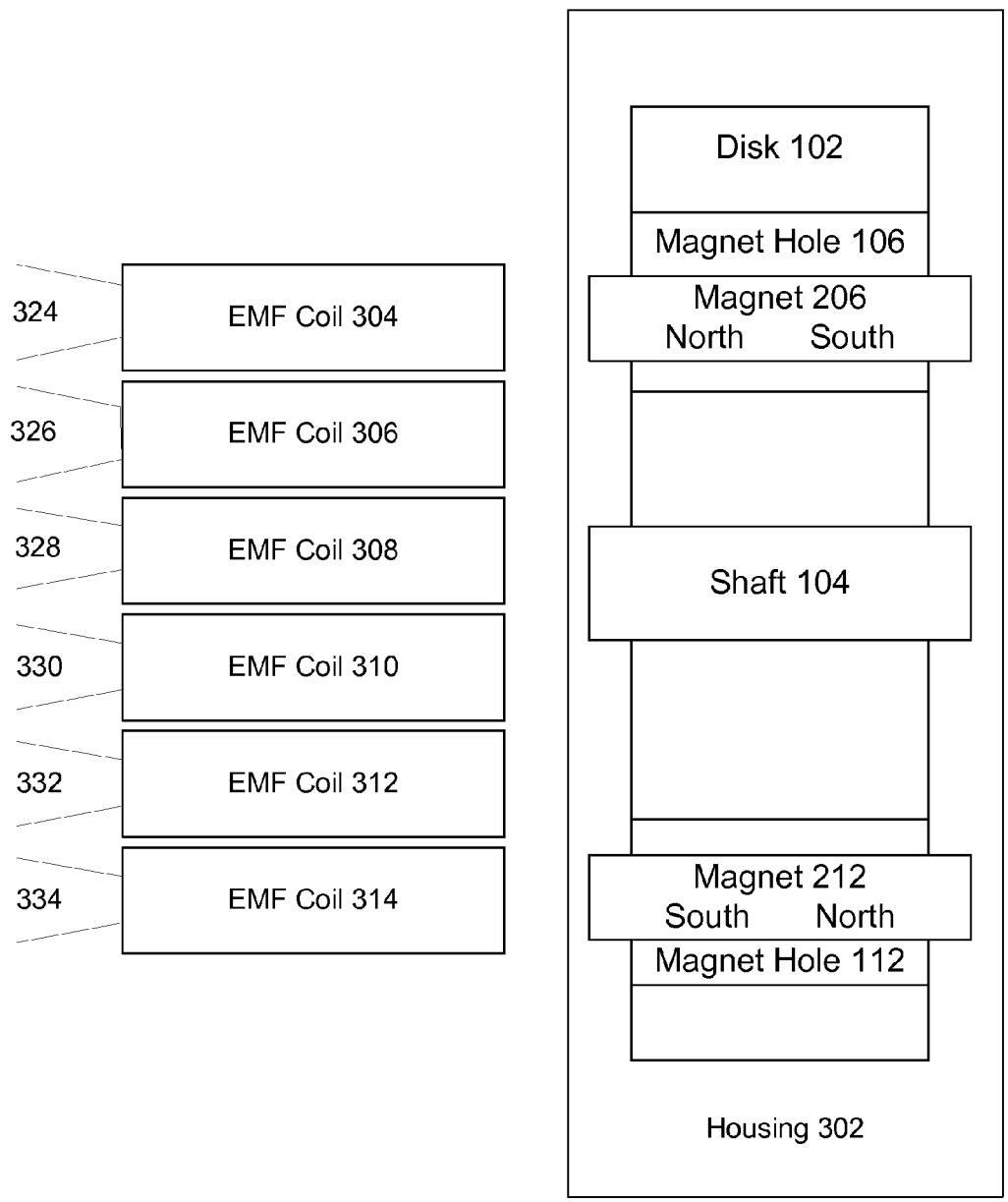
FIG. 4 illustrates a side cross-sectional view of multiple EMF coil assemblies in proximity to a housing for a power module disk, in accordance with one embodiment of the invention.

FIG. 4 illustrates multiple EMF coil assemblies in proximity to a power module disk, in accordance with one embodiment of the invention. For clarity, FIG. 4 is not drawn to scale. Housing 302 shows a side cross-sectional view of the disk 102, showing the magnet holes 106 and 112, magnets 206 and 212, and the shaft 104, as shown in FIG. 2. In proximity to one side of housing 302 are EMF coils 304, 306, 308, 310, 312, and 314, with corresponding connection leads 324, 326, 328, 330, 332, and 334 to the respective EMF coils. In one embodiment ferrite cores are used in some or all of the EMF coils. EMF coils and ferrite cores are available from various commercial suppliers (e.g., Coleman Magnetics, with corporate headquarters in Vacaville, Calif.; McMaster Carr, with corporate headquarters in Atlanta, Ga.; and other suppliers). In one embodiment nano-crystalline metal alloy cores (with relatively low energy losses at alternating magnetic frequencies up to 100,000 Hertz) are used in some or all of the EMF coils to minimize energy losses in the cores experiencing higher frequency AC magnetic fields. Nano-crystalline metal alloy cores are available from various commercial suppliers (e.g., Magnetic Metals, with corporate headquarters in Camden, N.J.; and other suppliers).

Figure 5:
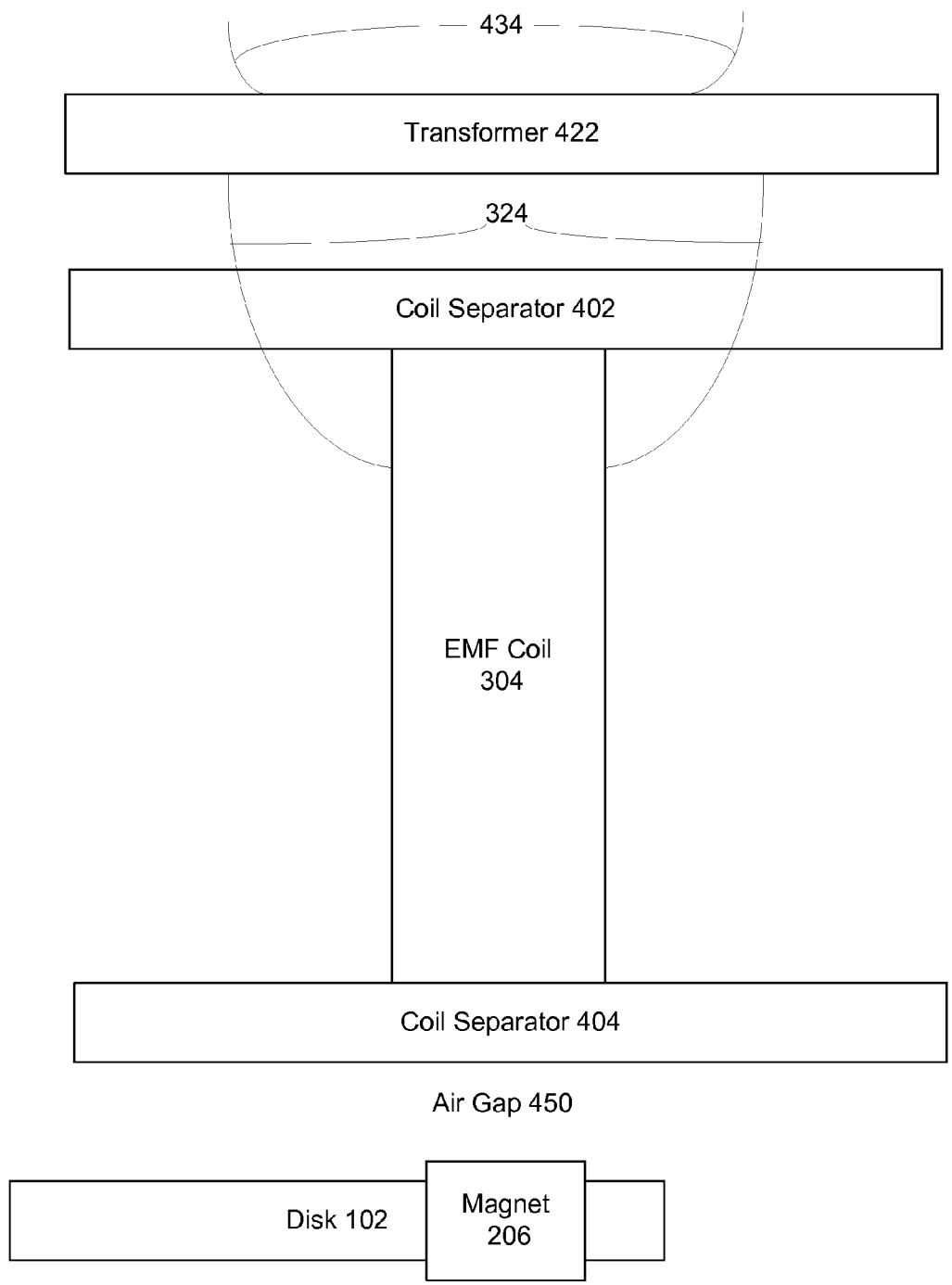
FIG. 5 illustrates an EMF coil assembly, in accordance with one embodiment of the invention.

FIG. 5 illustrates an EMF coil assembly, in accordance with one embodiment of the invention. For clarity, FIG. 5 is not drawn to scale. For clarity, only magnet 206 is shown in disk 102. Shown are an air gap 450, a coil separator 404, an EMF coil 304, a coil separator 402, connection leads 324 from the EMF coil 304, a transformer 422 connected to connection leads 324, and output leads 434 from transformer 422 to convert the electrical energy to a desired voltage and current. In one embodiment, depending on the practical mechanical tolerances that can be achieved, the air gap 450 could range from 0.2 centimeter to 1.7 centimeters, and the coil separators 402 and 404 could be fabricated from a flat sheet of Plexiglas®, Lexan®, or from another equivalent insulating material. The EMF coil 304 may provide an alternating current voltage ranging from 2 volts to hundreds of volts, depending on the rotational velocity of the magnet 206, the distance of the EMF coil 304 from the magnet 206, and the number of windings on the EMF coil 304. In an alternative embodiment, a high permeability alloy is inserted inside the EMF coil 304.

In alternative embodiments, the coils may have any appropriate number of windings to achieve any desired output voltage and current. The wiring of the coils should include wire with a thickness gauge sufficient to handle large induced currents, depending on the load, the transformer ratio, the number of windings on the coils, and the rate of change of the magnetic flux inside the coils. In one embodiment of the invention, 18 gauge copper wire is used to fabricate the coils. In another embodiment, 20 gauge copper wire is used to fabricate the coils. Other gauges of wire or flat ribbons of copper or other conducting metals or metal alloys can be used in other embodiments of the invention.

If the current output needs to be converted to a higher voltage and a lower current, a step-up transformer can be used to achieve a higher voltage and lower current from the output of the coils. An appropriate transformer can also be used to adjust the output impedance of the power module. Other equivalent power conversion can be achieved, but at some loss in electrical power conversion efficiency. Since the frequency of the electricity generated will typically be far in excess of 60 Hz, any transformer used should be designed to have low energy loss at high frequency operation. Voltage regulators are also used in some embodiments of the invention. Transformers and voltage regulators for various embodiments are available from multiple commercial suppliers (e.g., Coleman Magnetics, with corporate headquarters in Vacaville, Calif.; and McMaster Carr, with corporate headquarters in Atlanta, Ga.; Jameco Electronic Components & Computer Products, with corporate headquarters in Belmont, Calif.; and other suppliers).

In one embodiment of the invention, the primary coils produce 87 volts RMS with 25 amperes of current, and the secondary coils produce 230 volts RMS with 18 amperes of current per phase. In one embodiment of the invention the stationary coils produce 230 volts RMS per phase. In one embodiment of the invention, a phase converter can combine three phases into one phase and can produce 120 volts RMS at 48 amperes at 60 Hertz. Phase converters (sometimes also called inverters) are available from multiple commercial suppliers (e.g., AC Delco, with corporate headquarters in Detroit, Mich.; Yamaha Motor Corporation USA, with corporate headquarters in Cypress, Calif.; and American Honda Power Equipment Division, with corporate headquarters in Alpharetta, Ga.; and other suppliers).

Figure 6:
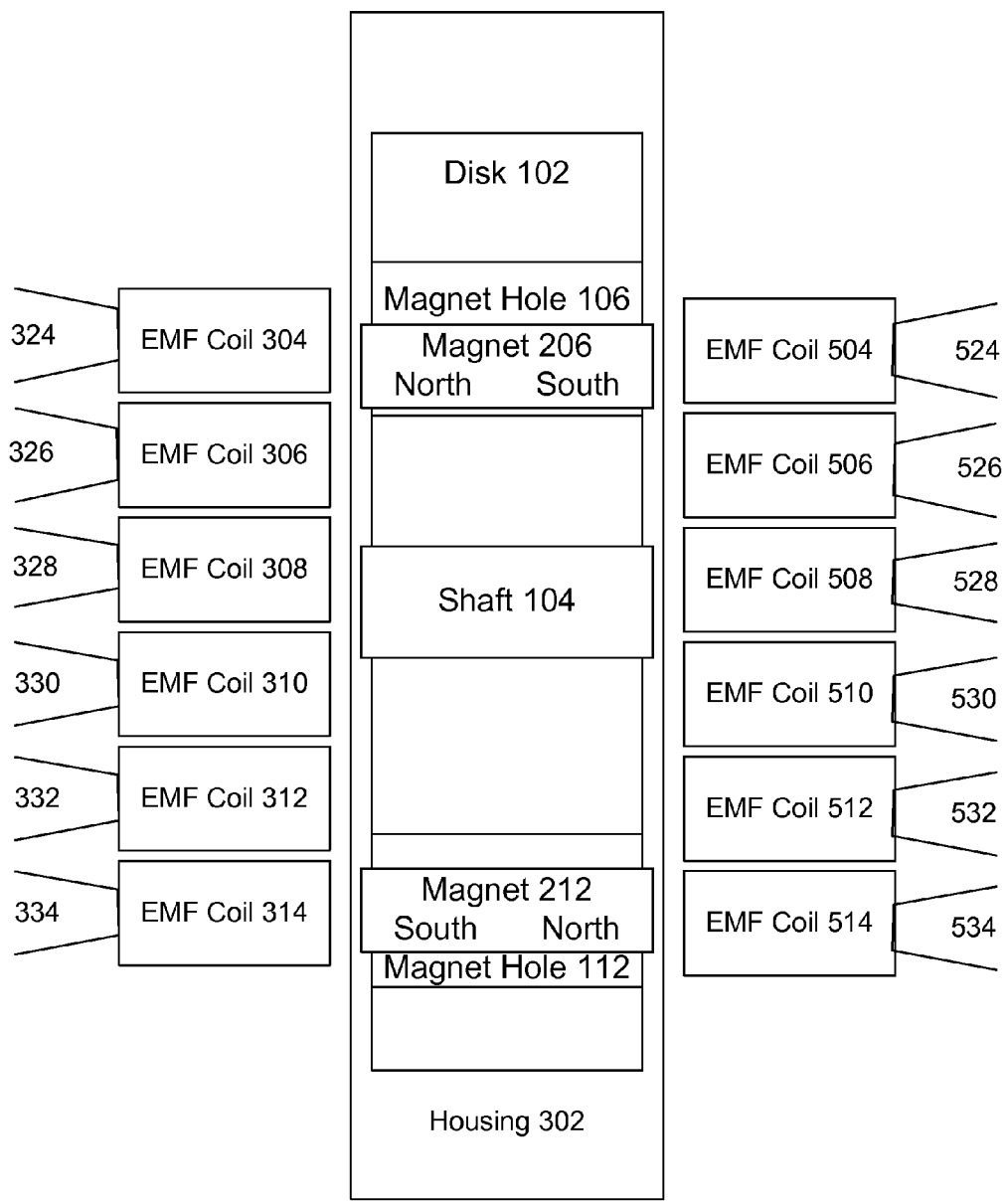
FIG. 6 illustrates multiple EMF coil assemblies in proximity to both sides of a power module disk, in accordance with one embodiment of the invention.

FIG. 6 illustrates multiple EMF coil assemblies in proximity to both sides of a power module disk, in accordance with one embodiment of the invention. For clarity, FIG. 6 is not drawn to scale. Housing 302 shows a side cross-sectional view of the disk 102, showing the magnet holes 106 and 112, magnets 206 and 212, and the shaft 104, as shown in FIGS. 2 and 4. In proximity to one side of housing 302 are EMF coils 304, 306, 308, 310, 312, and 314, with corresponding connection leads 324, 326, 328, 330, 332, and 334 to the respective EMF coils. In proximity to the other side of housing 302 are EMF coils 504, 506, 508, 510, 512, and 514, with corresponding connection leads 524, 526, 528, 530, 532, and 534 to the respective EMF coils. In various embodiments, the placement and the number of EMF coils are arbitrary and can be selected for the needs of a specific application. For example, in one embodiment, three EMF coils can be placed in a triangular configuration on at least one side of the housing 302 to generate three phases of AC voltage from the rotating magnetic fields generated by the rotation of the disk 102 and the magnets assembled on the disk 102.

Multiple Power Modules

Figure 7:
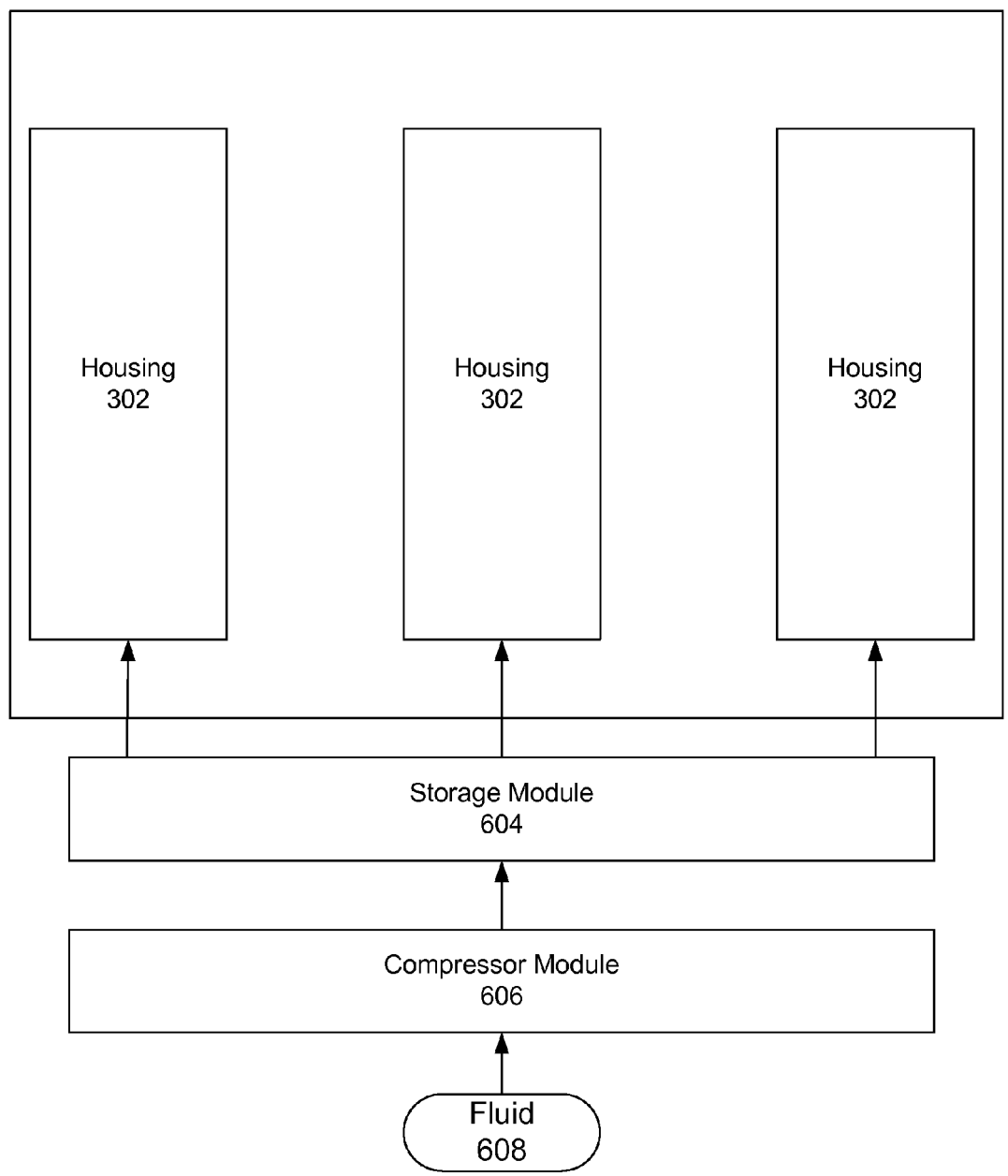
FIG. 7 illustrates a multiple power module arrangement, in accordance with one embodiment of the invention.

FIG. 7 illustrates a multiple power module arrangement, in accordance with one embodiment of the invention. For clarity, FIG. 7 is not drawn to scale. Each housing 302 contains a power module disk (not shown), and each power module disk is coupled to a pressurized working fluid provided by storage module 604. Compressor module 606 provides a pressurized working fluid to storage module 604, wherein the energy to pressurize the working fluid is derived from the motion of a fluid 608. In one embodiment, the working fluid and the fluid are the same fluid. In another embodiment, the working fluid and the fluid are different fluids. In one embodiment, the storage module 604 is a stainless steel air tank. In one embodiment, the compressor module 606 is a windmill and the fluid and working fluid are a gas (e.g., air). In another embodiment, the compressor module 606 utilizes one or more floor modules to provide a pressurized working fluid, such as air. One embodiment of the invention uses a 25 PSI (pounds per square inch) and 6 CFM (cubic feet per minute) compressor windmill to compress air. Such windmills are commercially available from Koenders Windmills, Inc., with corporate headquarters in Englefeld, Saskatchewan, Canada; Superior Windmills, Inc., with corporate headquarters in Regina, Saskatchewan, Canada; and other suppliers.

The packing density of the power module disks and their housings is determined by many factors, such as the working fluid used, the physical dimensions of the disks and housings of the power modules, and the physical dimensions of the EMF coils and their associated materials. For example, center-tapped EMF coils allow closely packed multiple disk arrangements, with a disk on each end of the coil to induce electromagnetic energy in the coil by the rotation of the magnetic fields of the disks.

Floor Module

Figure 8:
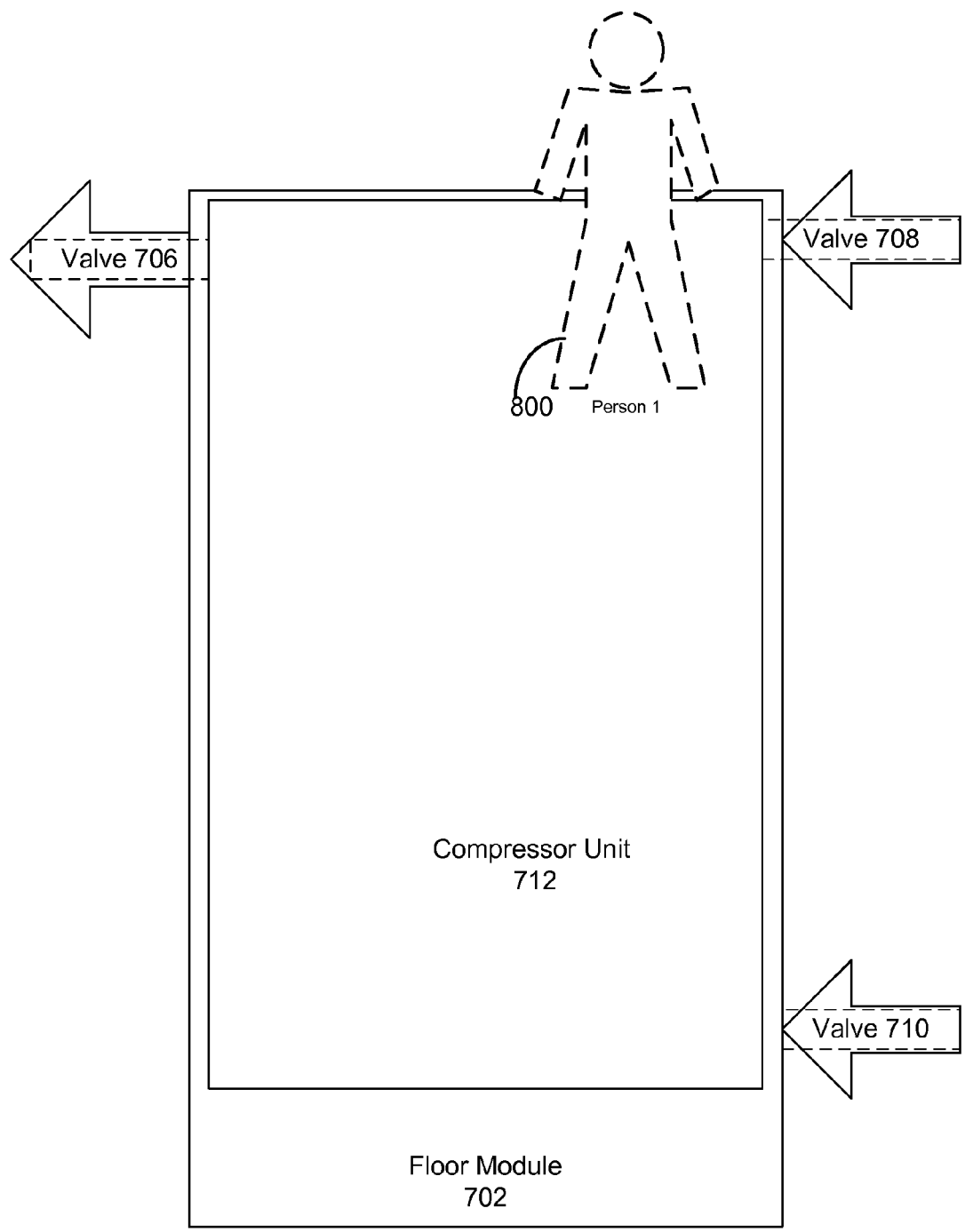
FIG. 8 illustrates a compressor module including a floor module to supply a compressed working fluid, in accordance with one embodiment of the invention.

FIG. 8 illustrates a compressor module including a floor module to supply a compressed working fluid (e.g., air, or an equivalent gas), in accordance with one embodiment of the invention. For clarity, FIG. 8 is not drawn to scale, and shows in dotted lines at least one person 800. Floor module 702 includes a compressor unit 712 and a plurality of uni-directional fluid valves—in this embodiment, this floor module has three uni-directional valves 706, 708, and 710. This floor module 702 may be on the surface of the floor, or it may be placed underneath a surface floor covering (e.g., a rug, linoleum, tile, or an equivalent). In one embodiment, the compressor unit 712 is made from two sheets (or one sheet) of memory foam, with collapsible elliptical or circular cross-sectioned tubing (but not expandable tubing) glued between the two sheets of memory foam. In another embodiment, another type of resilient material that will return to its original shape (e.g., a generic open cell polyolefin, open cell polyester, open cell latex, foam rubber, or an equivalent material) can be used instead of memory foam. In one embodiment, the valves 706, 708, and 710 are air valves, and the working fluid is air. In one embodiment using tubing filled with air, the inner diameter of the tubing is between 0.0625 inch (0.1588 centimeter) and 0.125 inch (0.3175 centimeter), and the sheets above and below the tubing are at least 0.125 inch (0.3175 centimeter) thick. In one embodiment using tubing filled with air, there are six lines of tubing tracing six parallel paths inside a network within a 12 inch (30 centimeters) square floor module. In another embodiment, the valves 706, 708, and 710 are fluid valves for a gas or liquid working fluid other than air.

An external weight or force (e.g., at least one person 800 is shown in dotted lines that walks on top on the floor module 702 is shown in FIG. 8, which is not drawn to scale) would press on the compressor unit 712 (e.g., a network of hollow tubing with one or two layers of resilient foam, or an equivalent material) in the floor module 702. The floor module 702 has a compressor unit 712 (e.g., an internal void) coupled with a first valve 706 coupled to either a pipe or another floor module (not shown). The floor module 702 also has a second valve 708 coupled to the compressor unit 712 to accept fluid in one direction supplied by another floor module (not shown) to replenish the fluid expelled out of valve 706. The floor module 702 also has a third valve 710 coupled to the compressor unit 712 to accept fluid in one direction supplied by the ambient environment (for example, the atmosphere, which is not shown) to replenish the compressor unit 712. In one embodiment, the fluid handled by all three valves is air, and the third valve 710 is merely an air valve with access to ambient air. First valve 706, second valve 708, and third valve 710 are all uni-directional, allowing fluid flow in only one direction. In one embodiment, the valves can be opened in one direction by a pressure differential as little as 0.01 PSI, but can resist being opened in the opposite direction by pressure differentials up to 175 PSI. Fluid valves and couplings can be obtained from various commercial suppliers (e.g., Royal Brass, Inc., with corporate headquarters in San Jose, Calif.; Parker Hannifin, with corporate headquarters in Cleveland, Ohio; W.W. Grainger, with corporate headquarters in Lake Forest, Ill.; and other suppliers).

Figure 9:
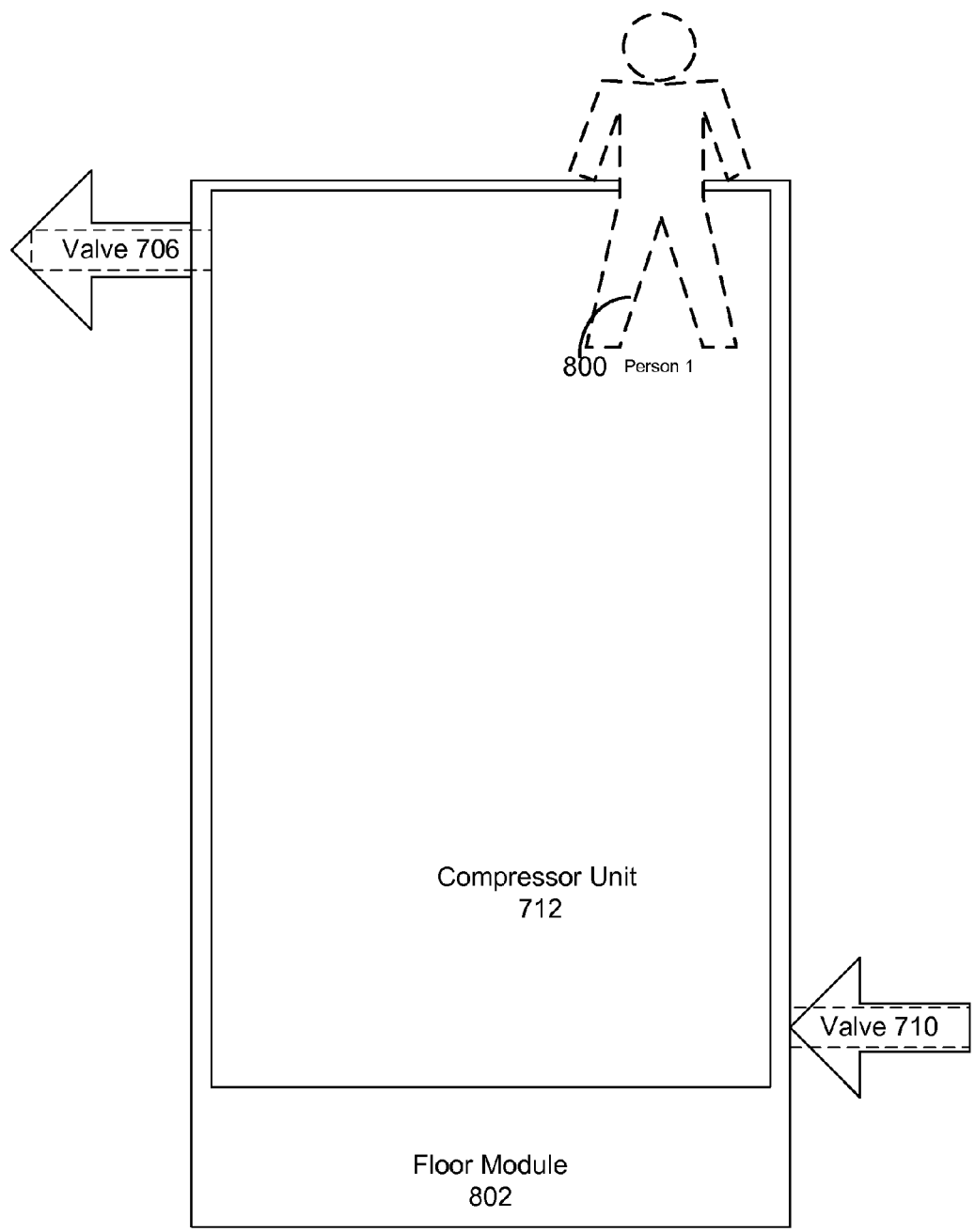
FIG. 9 illustrates a compressor module including a floor module to supply a compressed working fluid, in accordance with one embodiment of the invention.

FIG. 9 illustrates a compressor module including a floor module to supply a compressed working fluid (e.g., air, or an equivalent gas), in accordance with one embodiment of the invention. For clarity, FIG. 9 is not drawn to scale, and it shows in dotted lines at least one person 800 that walks on top of the floor module 702. Floor module 702 includes a compressor unit 712 and a plurality of uni-directional fluid valves—in this embodiment, this floor module 702 has two uni-directional valves 706 and 710. This floor module 702 may be on the surface of the floor, or it may be placed under a floor covering (e.g., a rug, linoleum, tile, or an equivalent). In one embodiment, the valves 706 and 710 are air valves, and valve 710 is merely an air valve connected to ambient air in order to replenish the air removed by means of valve 706 from the compressor unit 712. In another embodiment, the valves 706 and 710 are fluid valves for working fluid gas or liquid fluid other than air. In the case of working fluids other than air, the working fluid would typically be utilized in a closed-loop system for re-use.

Figure 10:
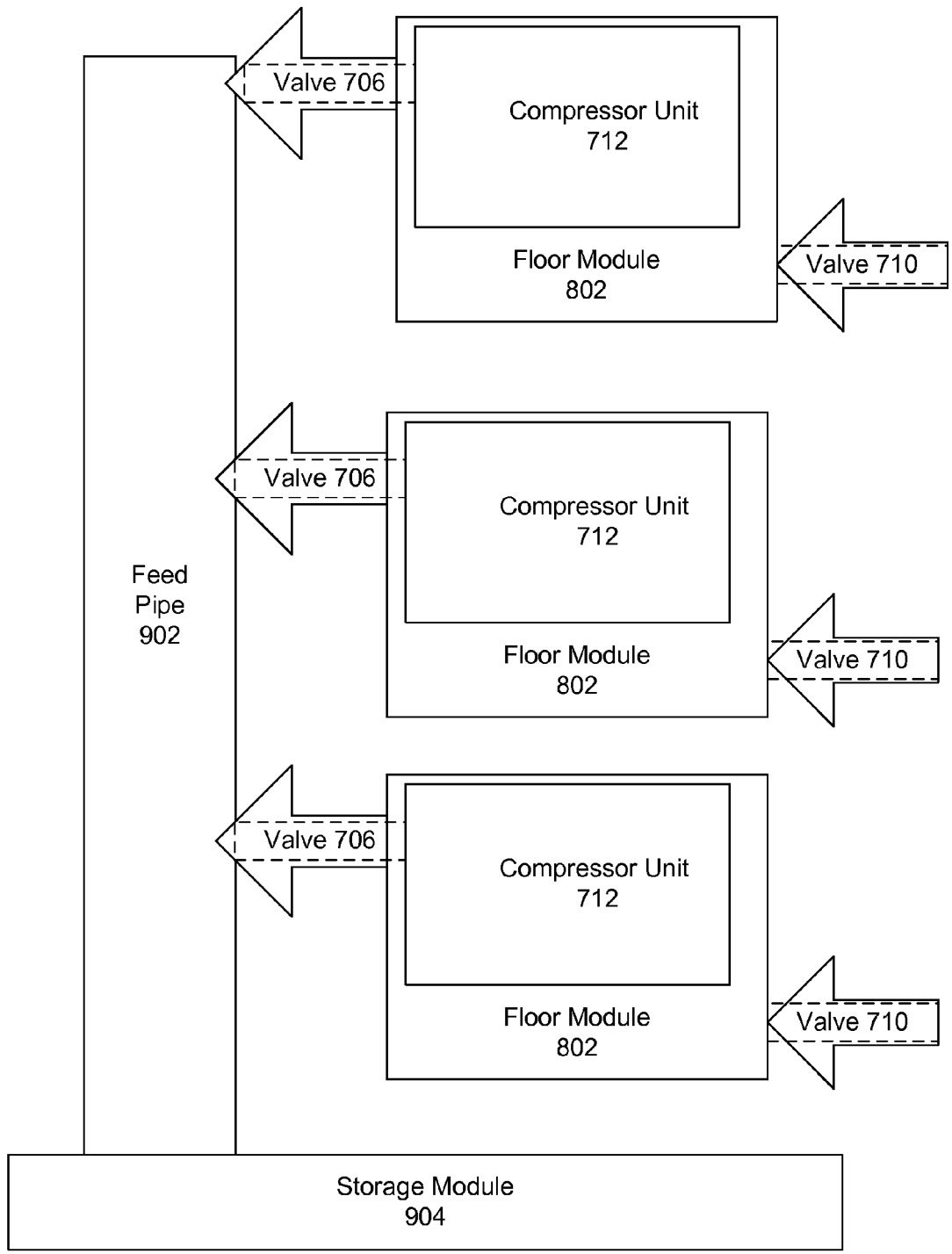
FIG. 10 illustrates a plurality of floor modules coupled together to provide a compressed fluid, in accordance with one embodiment of the invention.

FIG. 10 illustrates a plurality of floor modules coupled together to provide a compressed fluid (e.g., air, or an equivalent gas), in accordance with one embodiment of the invention. For clarity, FIG. 10 is not drawn to scale. The floor modules 802 are coupled together to provide a compressed fluid (e.g., air, or an equivalent gas) that can be compressed by the weight of people and objects moving over the plurality of floor modules 802. These floor modules 802 may be on the surface of the floor, or be placed under a floor covering (e.g., a rug, linoleum, tile, or an equivalent). These floor modules 802 are interconnected by a network of feed pipes 902 to route the fluid (e.g., air, or an equivalent gas) in one direction into a storage module 904 (e.g., an air tank) that supplies a compressed fluid (e.g., air, or equivalent gas) to a power module (not shown).

Figure 11:
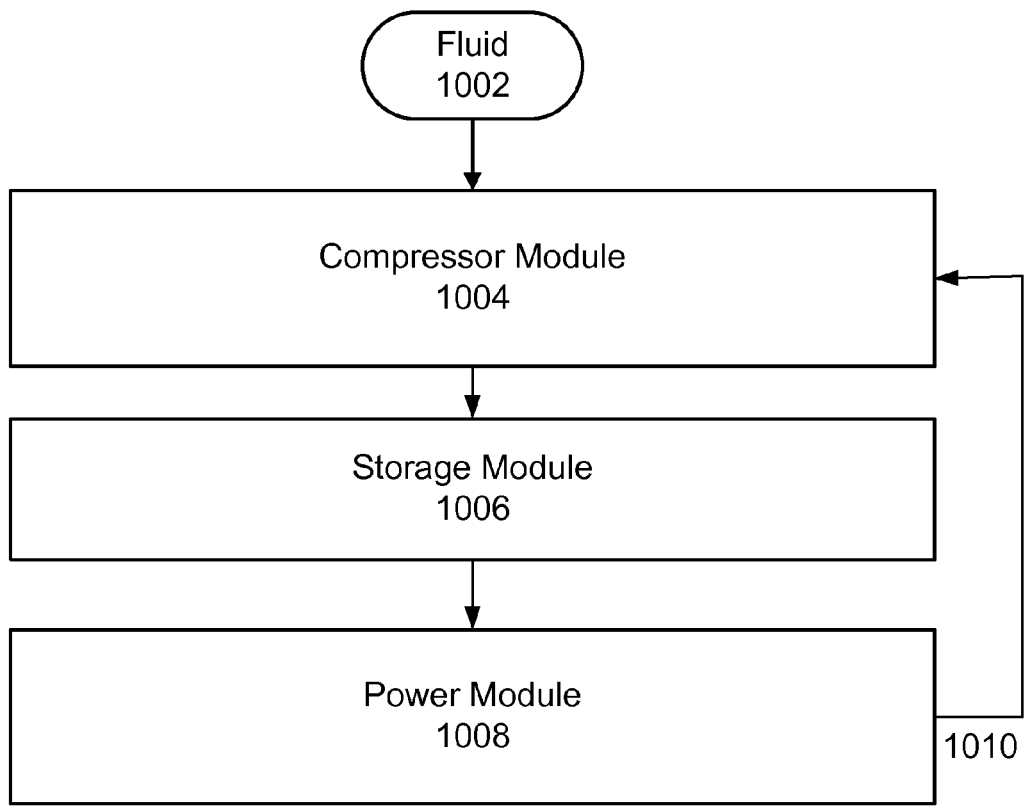
FIG. 11 illustrates a general compression system to provide a pressurized working fluid, in accordance with one embodiment of the invention.

FIG. 11 illustrates a general compression system to provide a pressurized working fluid, in accordance with one embodiment of the invention. For clarity, FIG. 11 is not drawn to scale. Fluid 1002 is an input to a compressor module 1004, which can be powered by any type of natural energy (e.g., a windmill, a plurality of floor modules, or an equivalent natural energy source) to pressurize a working fluid for storage in storage module 1006. Storage module 1006 supplies pressurized working fluid to power module 1008 for movement of the working fluid to a lower pressure state and to thereby generate electricity or another type of usable energy. In one embodiment, the lower pressure state may simply be an exhaust to the atmosphere in the case of a system using air as a working fluid. In another embodiment, the lower pressure state may be another lower pressure region in a closed loop system in the case of using some other type of fluid used as a working fluid, such as Freon or other gases or fluids that must be recycled. In such an embodiment, there would be a feedback connector 1010 to take the working fluid from the power module 1008 back to the compressor module 1004 for re-pressurization.

Wind Power Module

Figure 12:
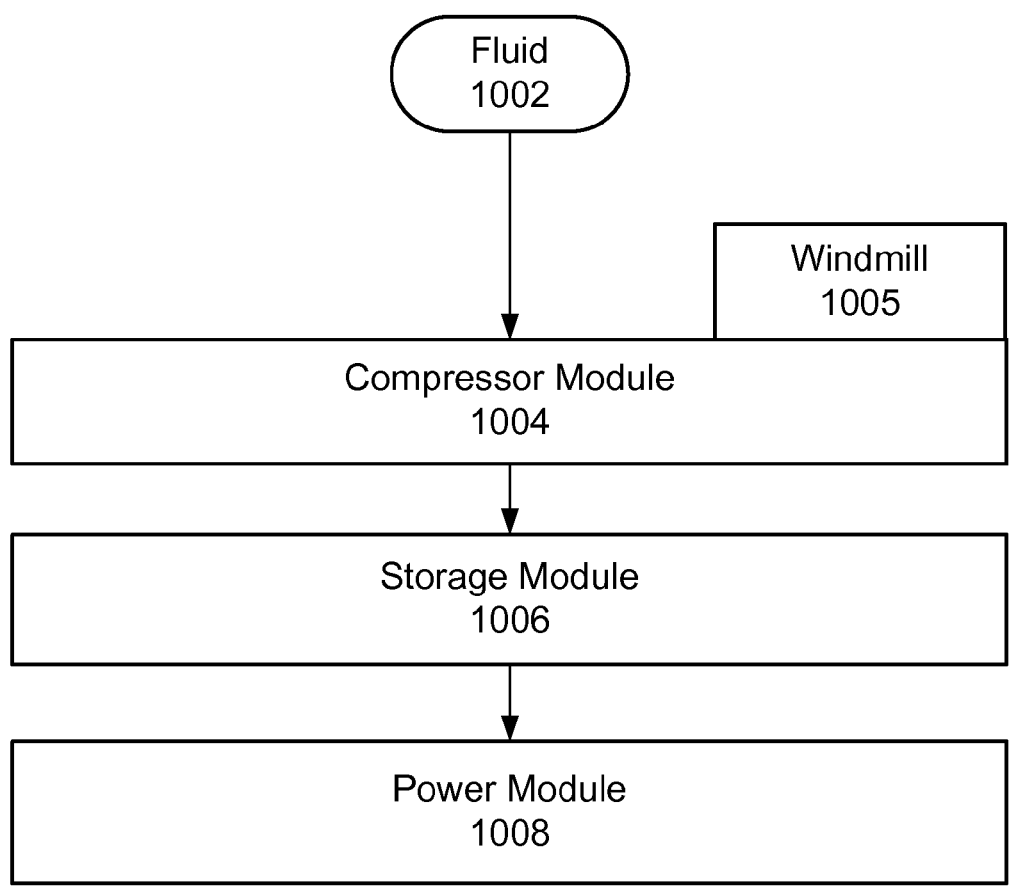
FIG. 12 illustrates a wind power system to provide a pressurized working fluid, in accordance with one embodiment of the invention.

FIG. 12 illustrates a wind power system to provide a pressurized working fluid, in accordance with one embodiment of the invention. For clarity, FIG. 12 is not drawn to scale. Fluid 1002 is an input to a compressor module 1004, which is powered by at least one windmill 1005 to pressurize a working fluid for storage in storage module 1006. Storage module 1006 supplies pressurized working fluid to power module 1008 for movement of the working fluid to a lower pressure state and to thereby generate electricity or another type of usable energy. In one embodiment, the lower pressure state may simply be an exhaust to the atmosphere in the case of a system using air as a working fluid. In another embodiment, the lower pressure state may be another lower pressure region in a closed loop system in the case of using some other type of fluid used as a working fluid, such as Freon or other fluids previously listed as alternative working fluids that must be recycled.

Figure 13:
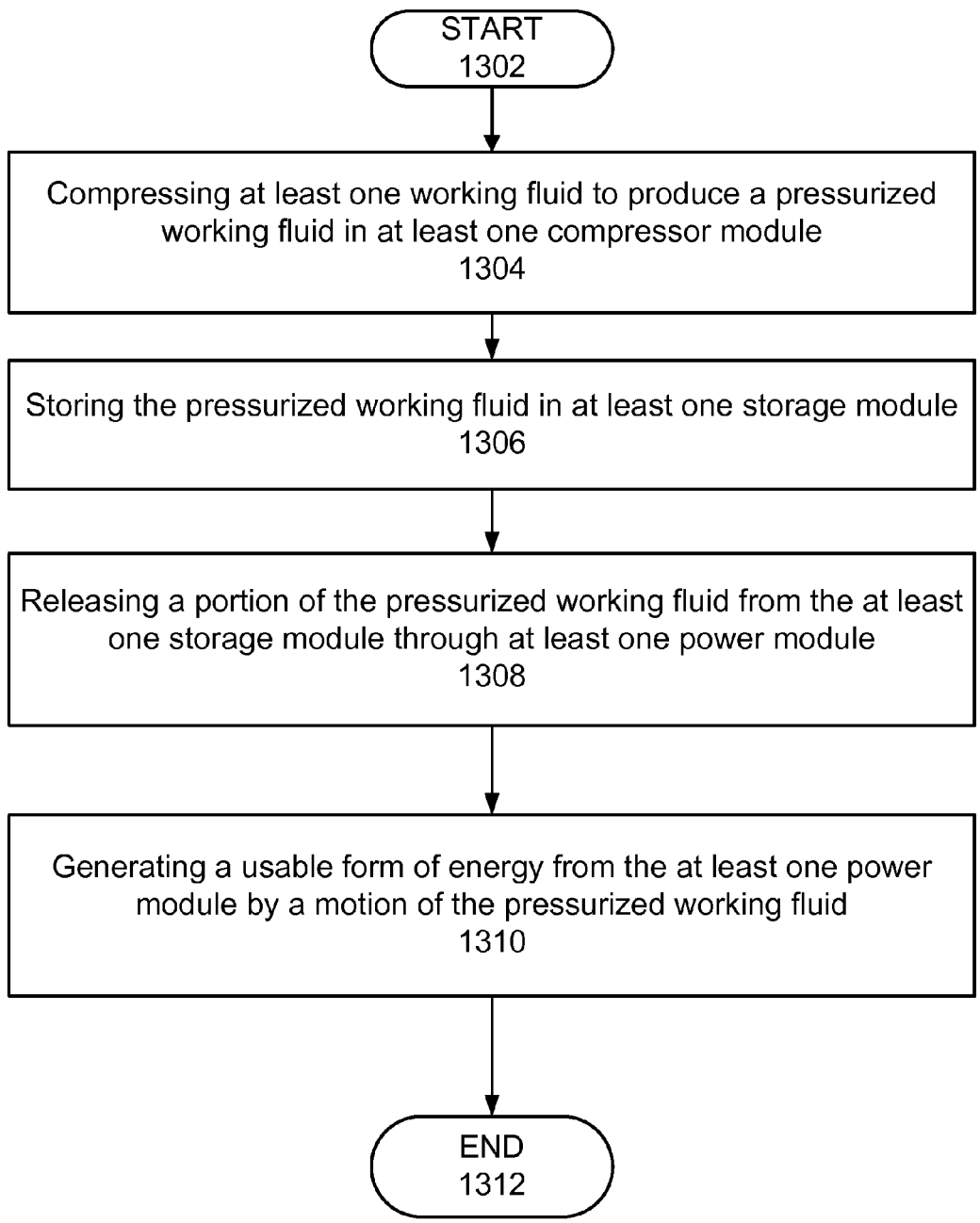
FIG. 13 illustrates a flowchart of a method to produce energy from the compression of at least one working fluid, in accordance with one embodiment of the invention.

FIG. 13 illustrates a flowchart of a method to produce energy from the compression of at least one working fluid, according to one embodiment of the invention. The sequence starts in operation 1302. Operation 1304 includes compressing at least one working fluid in a compressor module to produce a pressurized working fluid. Operation 1306 is next and includes storing the pressurized working fluid in at least one storage module. Operation 1308 is next and includes releasing a portion of the pressurized working fluid from the at least one storage module through at least one power module. Operation 1310 is next and includes generating a usable form of energy from the at least one power module by a motion of the portion of the pressurized working fluid. The method ends in operation 1312.

Figure 14:
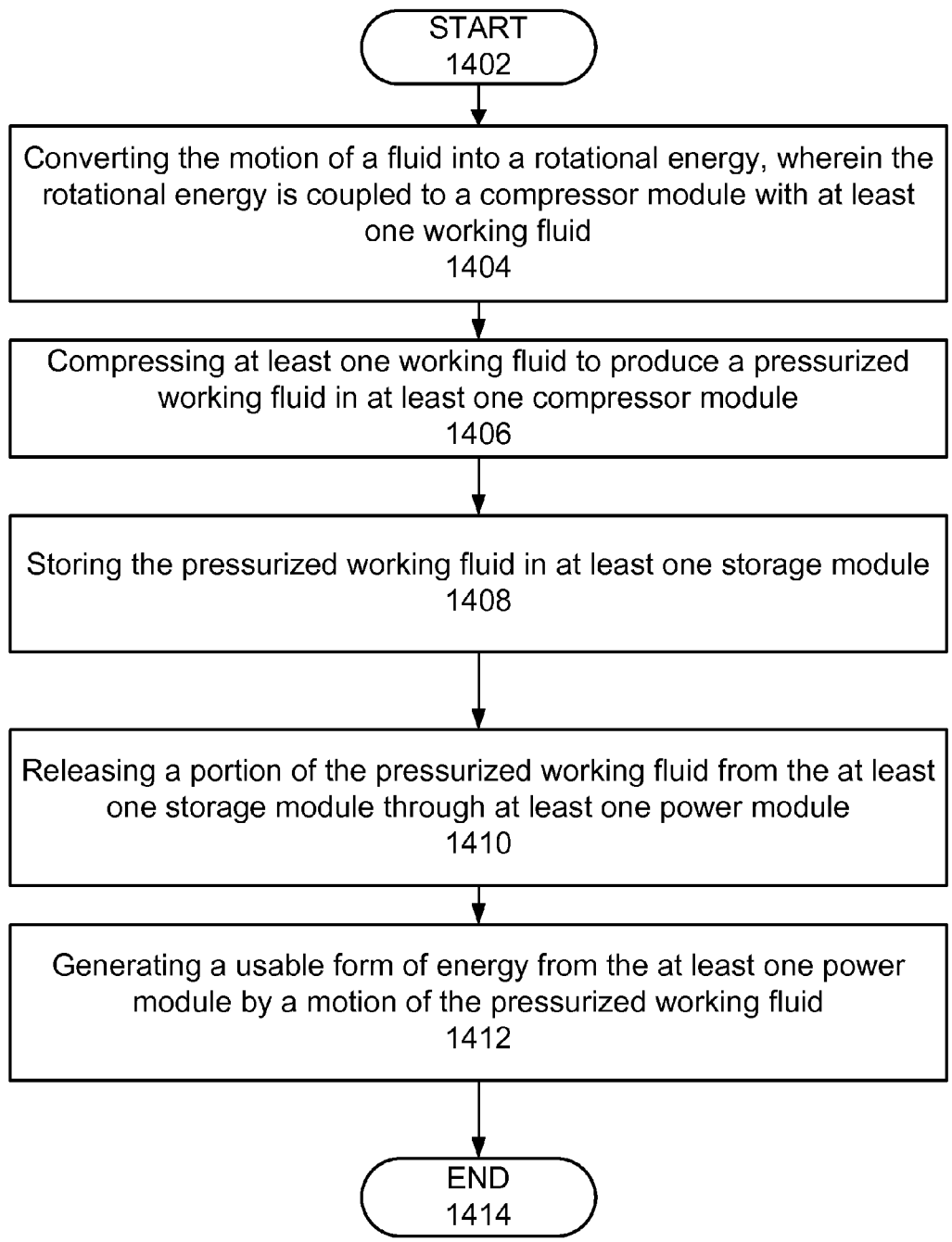
FIG. 14 illustrates a flowchart of a method to produce energy from the compression of at least one working fluid, in accordance with one embodiment of the invention.

FIG. 14 illustrates a flowchart of a method to produce energy from the compression of at least one working fluid, according to one embodiment of the invention. The sequence starts in operation 1402. Operation 1404 includes converting the motion of a fluid into a rotational energy, wherein the rotational energy is coupled to a compressor module with at least one working fluid. Operation 1406 includes compressing the at least one working fluid in a compressor module to produce a pressurized working fluid. Operation 1408 is next and includes storing the pressurized working fluid in at least one storage module. Operation 1410 is next and includes releasing a portion of the pressurized working fluid from at the at least one storage module through at least one power module. Operation 1412 is next and includes generating a usable form of energy from the at least one power module by a motion of the portion of the pressurized working fluid. The method ends in operation 1414.

Figure 15:
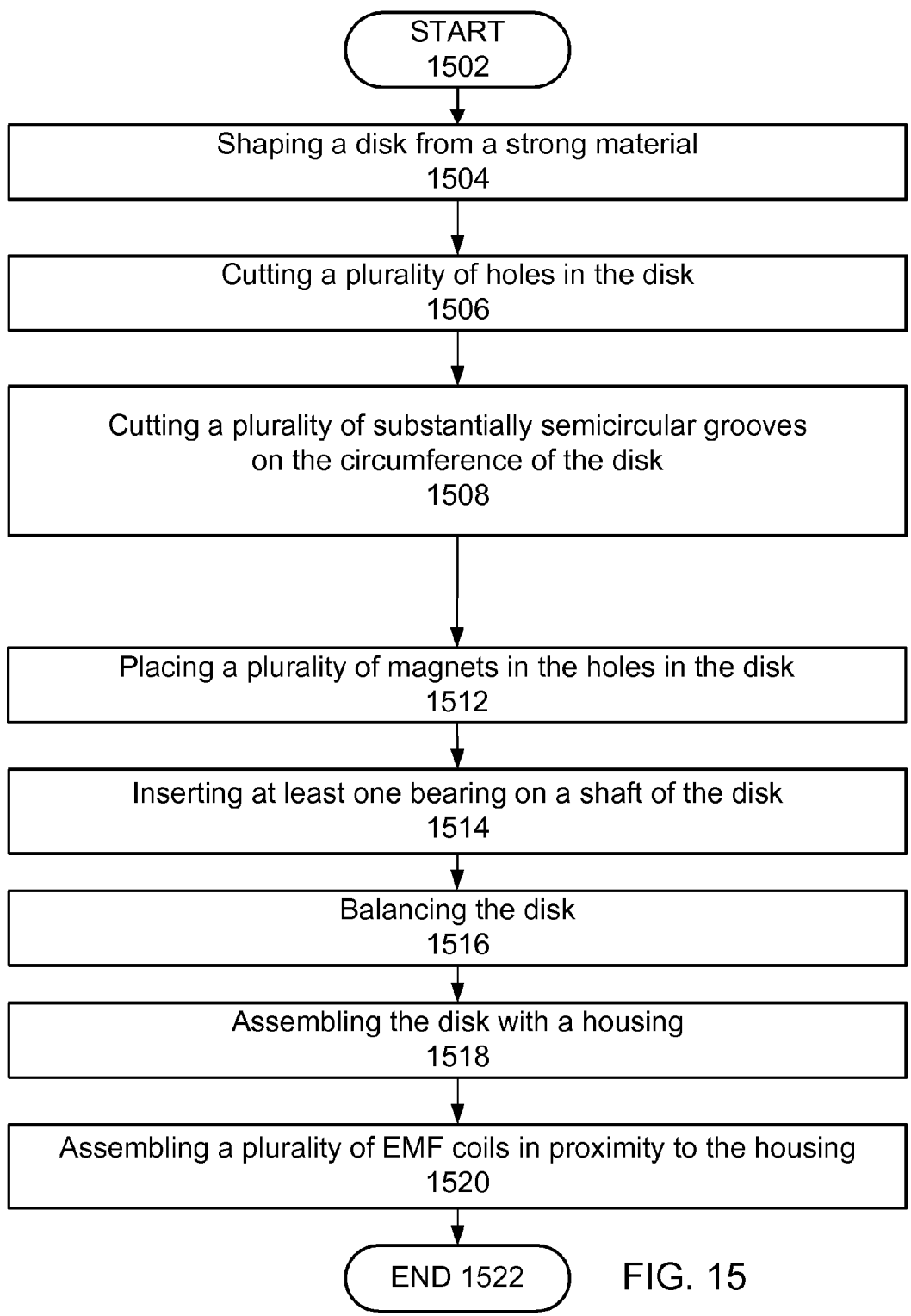
FIG. 15 illustrates a flowchart of a method to fabricate a power module, in accordance with one embodiment of the invention.

FIG. 15 illustrates a flowchart of a method to fabricate a power module, according to one embodiment of the invention. The sequence starts in operation 1502. Operation 1504 includes shaping (e.g., molding, stamping, cutting, or an equivalent) a disk from a strong material (e.g., aluminum, a metal alloy, a glass-reinforced plastic, or an equivalent). Operation 1506 includes cutting a plurality of holes in the disk for a plurality of magnets. Operation 1508 includes cutting a plurality of substantially semicircular grooves on the circumference of the disk. In various embodiments, the substantially semicircular grooves may have a circular or nearly circular shape or another shape that is relatively effective at converting the tangential linear motion of a fluid on the circumference of the disk into a rotational energy of the disk. Operation 1512 includes placing a plurality of magnets in a plurality of holes in the disk. Operation 1514 includes inserting at least one bearing on the shaft of the disk. Operation 1516 includes balancing the disk. Operation 1518 includes assembling the disk with a housing. Operation 1520 includes assembling a plurality of EMF coils in proximity to the housing. The method ends in operation 1522.

Figure 16:
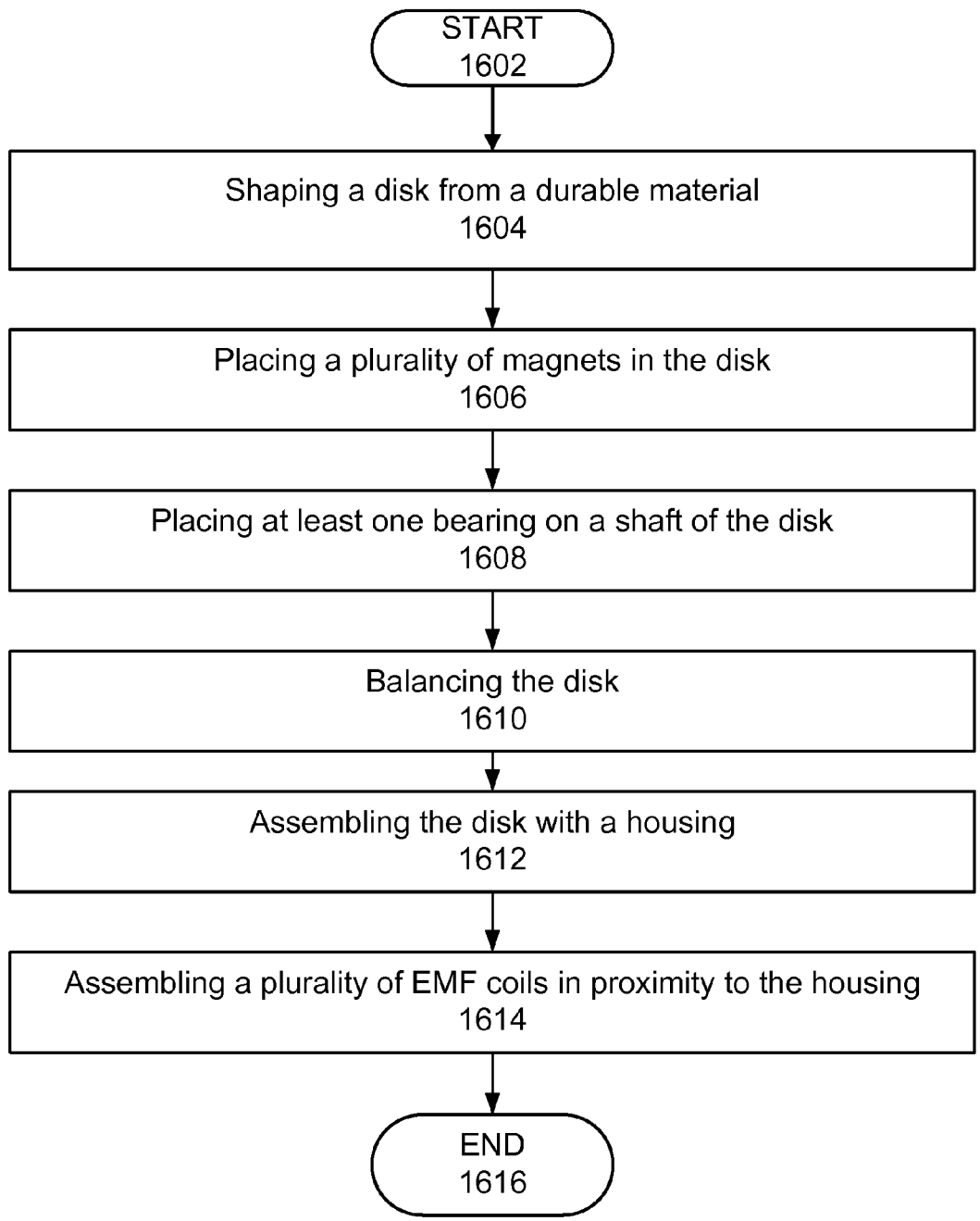
FIG. 16 illustrates a flowchart of a method to fabricate a power module, in accordance with one embodiment of the invention.

FIG. 16 illustrates a flowchart of a method to fabricate a power module, according to one embodiment of the invention. The sequence starts in operation 1602. Operation 1604 includes shaping a disk from a material (e.g., a disk material previously listed above). Operation 1606 includes placing a plurality of magnets in a plurality of holes in the disk. Operation 1608 includes inserting at least one bearing on the shaft of the disk. Operation 1610 includes balancing the disk. Operation 1612 includes assembling the disk with a housing. Operation 1614 includes assembling a plurality of EMF coils in proximity to the housing. The method ends in operation 1616.

In one embodiment of the invention, the kinetic energy of a working fluid is applied to a disk in order to produce the torque to turn an electrical generator, instead of using the disk itself as an electrical generator. For example, in one embodiment a working fluid (e.g., air) at 800 pounds per square inch of pressure (PSI) is applied to rotate a disk approximately 3 inches in diameter in order to generate 12 foot pounds of torque to rotate the shaft of a 4000-watt generator with magnetic fields supplied by permanent magnets. Such electrical generators are available from multiple commercial suppliers (e.g., AC Delco, with corporate headquarters in Detroit, Mich.; Yamaha Motor Corporation USA, with corporate headquarters in Cypress, Calif.; and American Honda Power Equipment Division, with corporate headquarters in Alpharetta, Ga.; and other suppliers).

Figure 17:
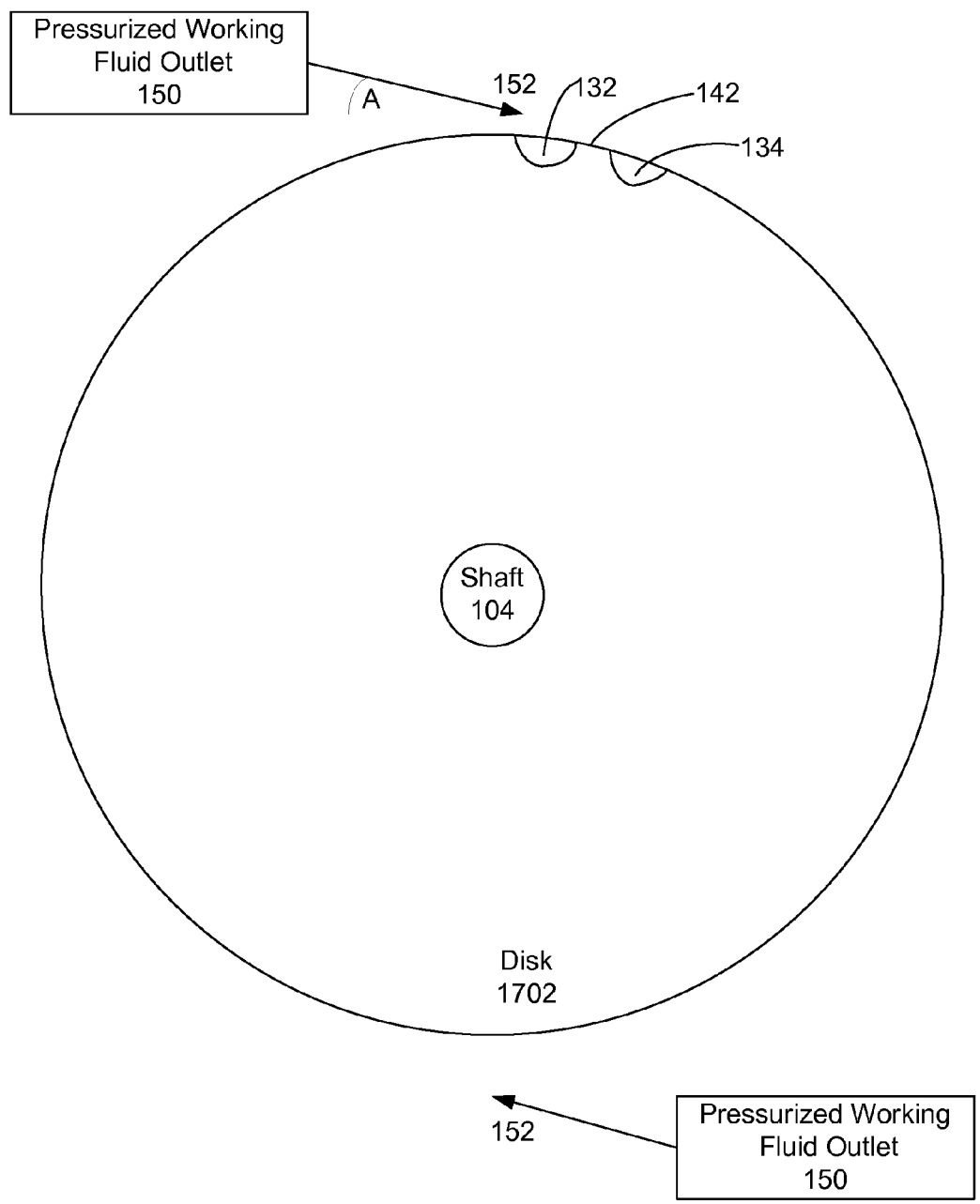
FIG. 17 illustrates a turbine without magnets, in accordance with one embodiment of the invention.

FIG. 17 illustrates a turbine without magnets, in accordance with one embodiment of the invention. For clarity, FIG. 17 is not drawn to scale. This front view includes a flat disk 1702, having a shaft 104 (or in an alternative embodiment a shaft hole for insertion of a shaft) for the later insertion of a bearing (not shown). The disk 1702 has a plurality of substantially semicircular grooves 132 and 134 and separations 142 fabricated along the entire circumference of the disk 102 (the substantially semicircular grooves 132 and 134 and separation 142 between the grooves 132 and 134 are shown greatly enlarged, and would be fabricated around the entire circumference of the disk 1702, but the semicircular grooves of the entire circumference of the disk are not shown for the sake of clarity). One or more pressurized working fluid outlets 150 (two are shown for clarity, but any number of such outlets can be used) provide a working fluid 152 with kinetic energy to rotate the disk 102. In one embodiment, the substantially semicircular arcs 132 and 134 would be major arcs (i.e., more than 180 degrees of arc) of circles or substantially circular ellipses. These substantially semicircular arcs 132 and 134 help improve the transfer of the kinetic energy of the working fluid 152 to the disk 1702, and increase the rotational energy of the disk 1702. In one embodiment of the invention, the substantially semicircular grooves 132 and 134 have a radius of approximately 0.025 inches (0.635 millimeters) and the separation 142 has a width of approximately 0.026 inches (0.66 millimeters). However, other embodiments of the invention can have either larger dimensions or smaller dimensions for the substantially semicircular grooves 132 and 134 and separation 142. And other embodiments of the invention can use grooves that are major or minor circular arcs or other substantially circular shaped arcs fabricated on the circumference of the disk 1702.

The disk 1702, when fully assembled, would be set in rotational motion by the kinetic energy of a pressurized working fluid 152 released and directed from one or more pressurized working fluid outlets 150. In one embodiment of the invention, the angle of incidence between the tangent of the circumference of the disk 1702 and the directed motion of the pressurized working fluid 152 is approximately 37 degrees to increase the efficiency of power transfer from the kinetic energy of the pressurized working fluid 152 to the disk 102. In other embodiments of the invention, other angles can be used. Furthermore, the dimensions of the substantially semicircular grooves (for example, substantially semicircular grooves 132 and 134) and separations (for example, separation 142) on the circumference of the disk 102 can also be optimized to capture the kinetic energy of the working fluid 152. In one embodiment of the invention, the width of the separation 142 is substantially equal to the radius of the substantially semicircular grooves 132 and 134 on the circumference of the disk 102 to increase the efficiency of energy transfer from the kinetic energy of the pressurized working fluid 152 to the rotational energy of the disk 1702. In other embodiments of the invention, other relative dimensions of the radii and separations can be used. The final steady state rotational velocity of the disk 1702 will correspond to a high revolution per minute (RPM), typically ranging from 5,000 to 60,000 RPM in various embodiments, so ceramic bearings or air bearings (not shown) in shaft 104 should be selected to sustain the high RPM for reliable operation. In various embodiments, the diameter of the disk 1702 would typically range from 2 inches (5.08 centimeters) to 10 inches (25.4 centimeters), but could be larger or smaller in other embodiments of the invention. In one embodiment of the invention, the thickness (width) of the disk 102 is 1.5 inches (3.81 centimeters), but the disk thickness can be less or more than 1.5 inches in other embodiments.

Figure 18:
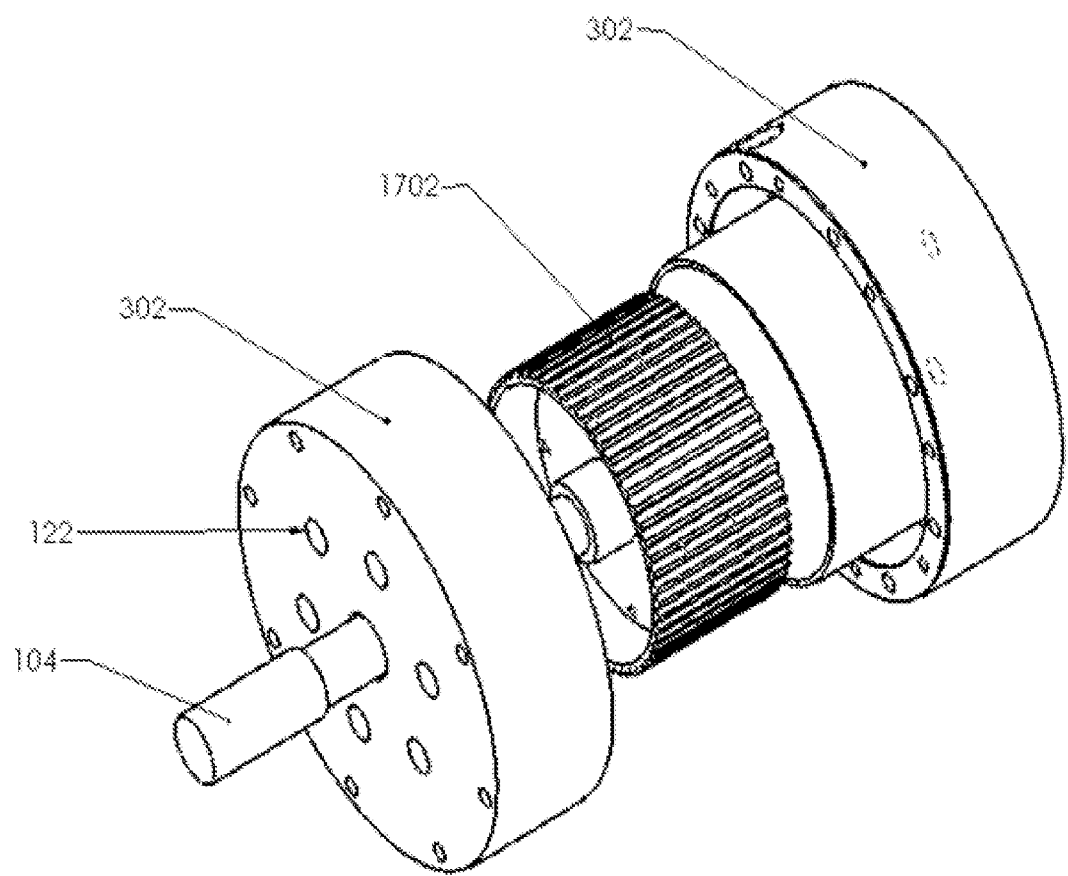
FIG. 18 illustrates an exploded view of a housing for a turbine disk, in accordance with one embodiment of the invention.

FIG. 18 illustrates an exploded view of a housing for a turbine disk, in accordance with one embodiment of the invention. For clarity, FIG. 18 is not drawn to scale. This view includes the housing 302 (split in separate parts) that encloses the sides and circumference of the disk 1702. This view also shows the shaft 104 for the later insertion of a bearing (not shown). Six exhaust holes 122 are also shown on the housing 302, and these would be used to route the pressurized working fluid after utilization to either a storage module (not shown) in a closed-loop system, or to atmosphere in the case of an open-loop system (e.g., using atmospheric air for the pressurized working fluid). The number of exhaust holes can be any number of exhaust holes, placed anywhere on the housing in various embodiments of the invention, as many and as large as necessary to completely the exhaust the working fluid after the energy is extracted. In one embodiment, the housing 302 is fabricated from one or more sheets of a polycarbonate resin, such as Lexan®, which is a material commercially available in sheets having a thickness typically ranging from 0.75 millimeter to 12 millimeters. In various embodiments, the thickness of the housing 302 would typically range from 5 millimeters to 25 millimeters. Alternative embodiments could be fabricated with one or more sheets of other strong, non-conducting materials, e.g., polymers such as polymethyl methacrylate (e.g., Plexiglas®, Lucite®, Perspex®) or an equivalent material. Some commercial suppliers of these materials have already been listed previously.

Figure 19:
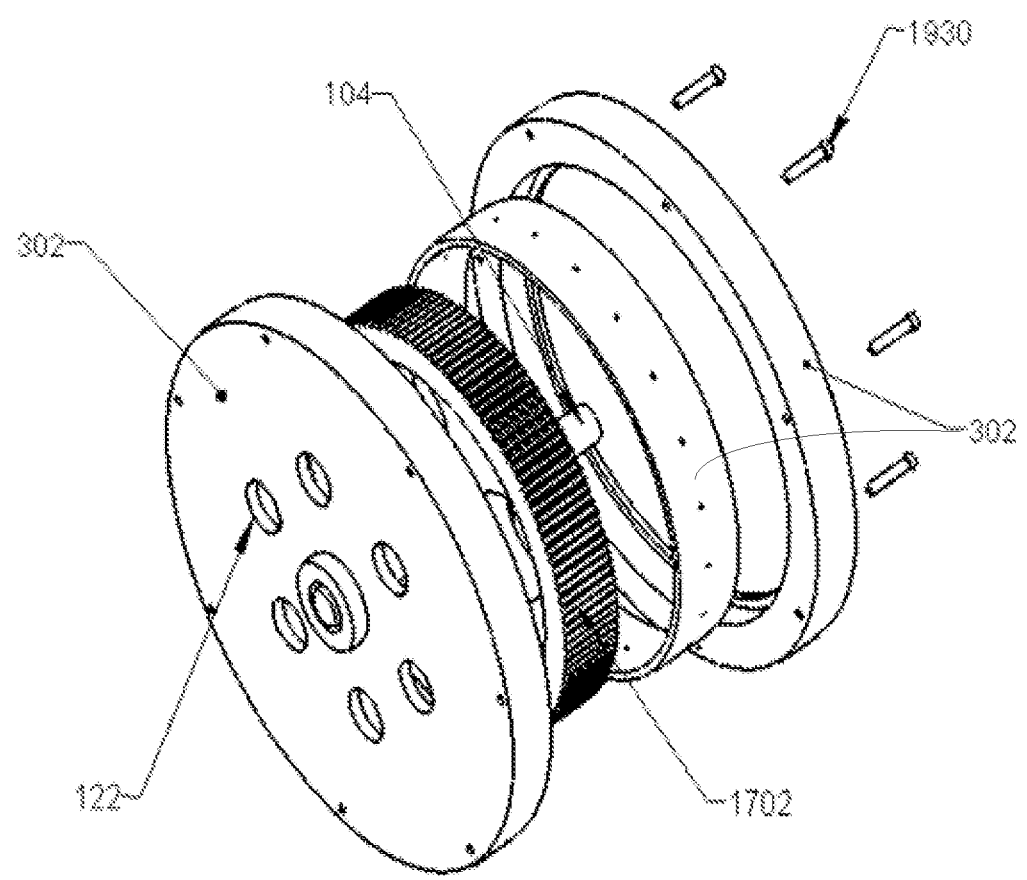
FIG. 19 illustrates another exploded view of a housing for a turbine disk, in accordance with one embodiment of the invention.

FIG. 19 illustrates an exploded view of a housing for a turbine disk, in accordance with one embodiment of the invention. For clarity, FIG. 19 is not drawn to scale. This view includes the housing 302 that encloses sides and circumference of the disk 1702, gasket 1804, and the bolts 1930 that will be used to hold the parts of the housing 302 together. In another embodiment, a very strong adhesive is used to assemble the housing instead of a gasket and bolts. This view also shows the shaft 104 for the later insertion of a bearing (not shown). Six exhaust holes 122 are also shown on the housing 302, and these would be used to route the pressurized working fluid after utilization to either a storage module (not shown) in a closed-loop system, or to atmosphere in the case of an open-loop system (e.g., using atmospheric air for the pressurized working fluid).

Figure 20:
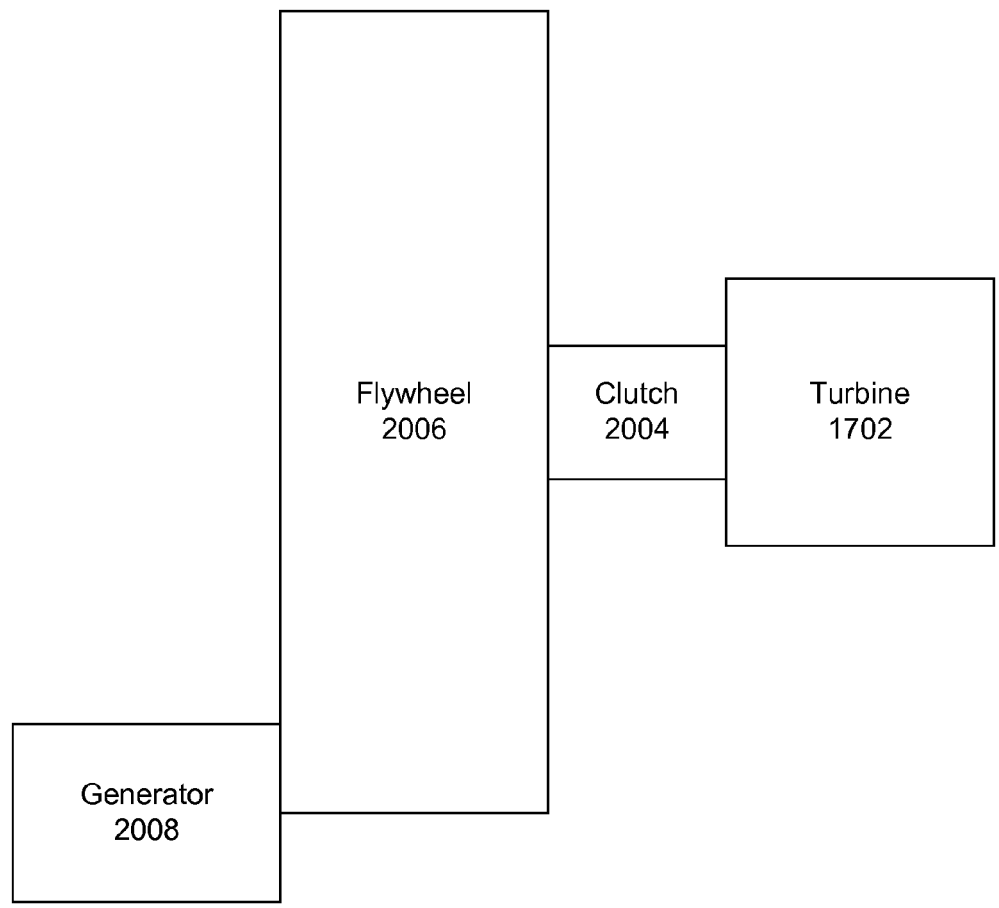
FIG. 20 illustrates a turbine and flywheel power module, in accordance with one embodiment of the invention.

FIG. 20 illustrates a turbine and flywheel power module, in accordance with one embodiment of the invention. This diagram includes a turbine disk 1702, a clutch 2004, a flywheel 2006, and a generator 2008. The generator 2008 (either fabricated or available from commercial sources previously listed) would generate electricity from rotational energy coupled from the flywheel 2006 to the generator 2008. The clutch 2004 (e.g., an air clutch or an equivalent clutch) is used as a variable speed power transmission between the turbine disk 1702 and the flywheel 2006 as one method to maintain the kinetic energy of the flywheel 2006. Clutches, such as air clutches, are available from various commercial suppliers (e.g., McMaster Carr, with corporate headquarters in Atlanta, Ga.; and other suppliers). In one embodiment, the working fluid to power the turbine is air, but other embodiments can use another equivalent working fluid as previously listed.

Figure 21:
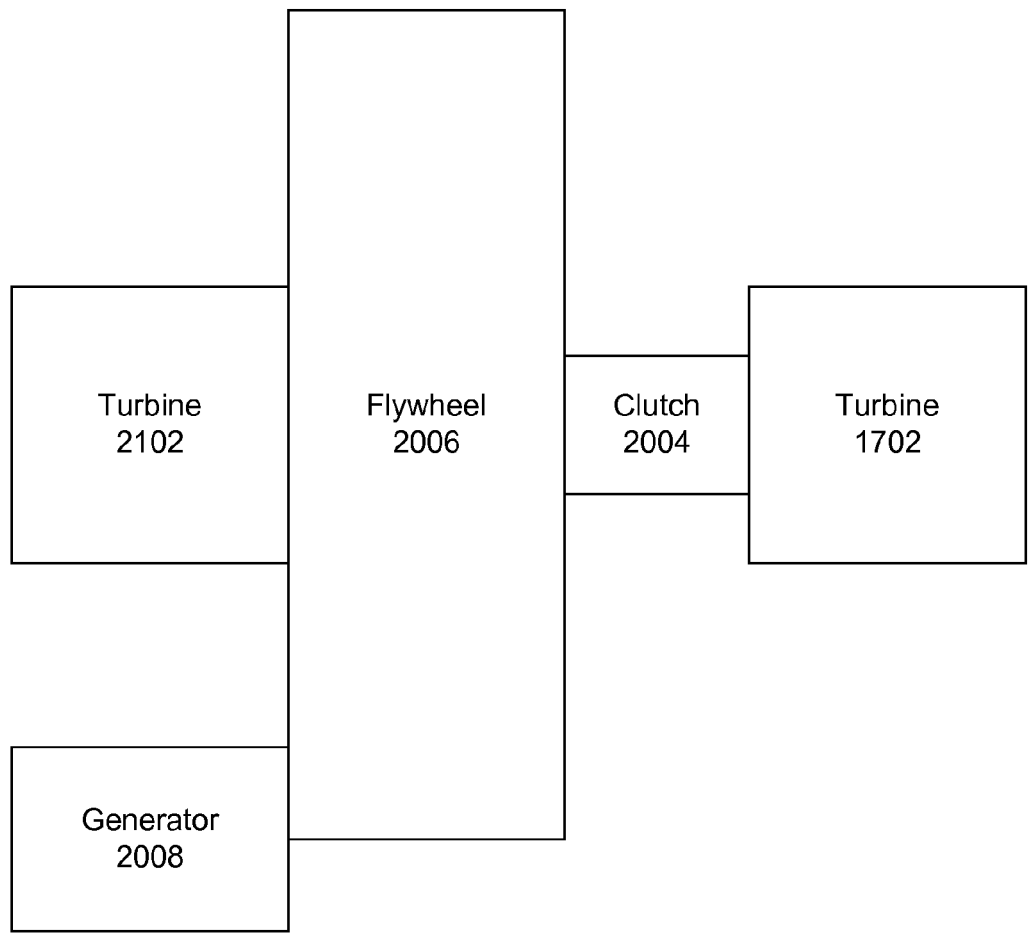
FIG. 21 illustrates a double turbine power module, in accordance with one embodiment of the invention.

FIG. 21 illustrates a double turbine power module, in accordance with one embodiment of the invention. This diagram includes a turbine disk 1702, a second turbine disk 2102, a clutch 2004, a flywheel 2006, and a generator 2008. The generator 2008 (either fabricated or available from commercial sources previously listed) would generate electricity from the rotational energy coupled from the flywheel 2006 to the generator 2008. The advantage of a double turbine power module is that a much lower air pressure is needed for the startup of a generator. In one embodiment of the invention using a double turbine power module, the air pressure required to create enough starting torque for a generator is reduced by a factor of four.

Figure 22:
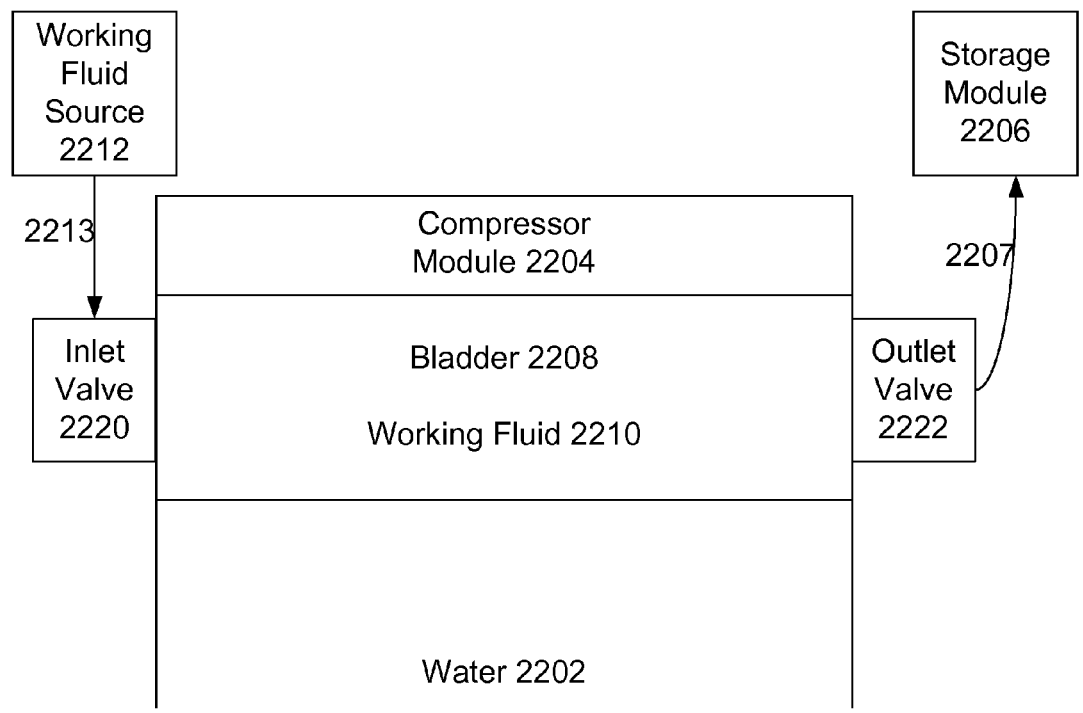
FIG. 22 illustrates a compressor module, in accordance with one embodiment of the invention.

FIG. 22 illustrates a compressor module, in accordance with one embodiment of the invention. For clarity, FIG. 22 is not drawn to scale. A compressor module 2204 is shown, which includes a compressible bladder 2208 containing a working fluid 2210 (e.g., air or any other working fluid previously listed), which is compressed by the movement (e.g., from tidal variations, wave motion, or variable water currents) of water 2202 through the bottom or sides of the compressor module 2204. An increase in the level of the water 2202 would compress the bladder 2208 and pressurize the working fluid 2210, a decrease in the level of the water 2202 would decompress the bladder 2208 for the beginning of the next cycle of compression and decompression of the bladder 2208. The working fluid 2210 can be replenished from the working fluid source 2212 through tube 2213 through one-way inlet valve 2220. The working fluid 2210 is released under pressure through one-way outlet valve 2222 to the storage module 2206 through tube 2207. The water 2202 can be any body of water (e.g., a body of water such as an ocean, lake, or river), and the compressor module 2204 can be positioned at any height in the body of water, such as near the surface or lower in the body of water. In one embodiment the compressor module 2204 is positioned at a fixed location in the water 2202. In another embodiment the compressor module 2204 can move up or down to some controlled extent in the water 2202. The bladder 2208 can be fabricated from any resilient material, but should be strong enough to resist the pressure differentials created. Furthermore, the compressor module 2204, storage module 2206, tube 2213, and tube 2207 can be fabricated from any durable material, but the materials used also need to be strong and rigid enough to resist the pressure differentials created.

Figure 23:
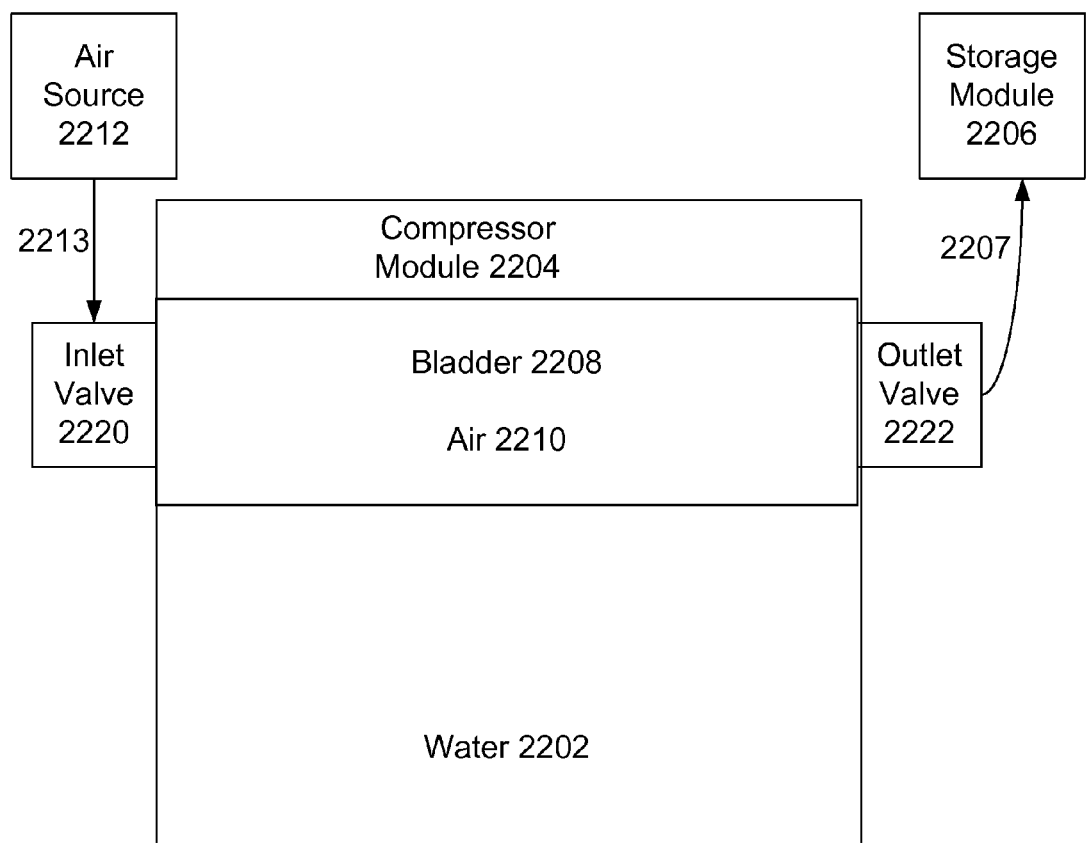
FIG. 23 illustrates a compressor module, in accordance with one embodiment of the invention.

FIG. 23 illustrates a compressor module, in accordance with one embodiment of the invention. For clarity, FIG. 23 is not drawn to scale. A compressor module 2204 is shown, which includes a compressible bladder 2208 containing air 2210 as the working fluid, which is compressed by the movement of water 2202 through the bottom or side of the compressor module 2204. The air 2210 can be replenished from the air source 2212 through tube 2213 through one-way inlet valve 2220. The working fluid 2210 is released under pressure through one-way outlet valve 2222 to the storage module 2206 through tube 2207. The water 2202 can be any body of water (e.g., a body of water such as an ocean, lake, or river), and the compressor module 2204 can be positioned at any height in the body of water, such as near the surface or lower in the body of water. In one embodiment the compressor module 2204 is positioned at a fixed location in the water 2202. In another embodiment the compressor module 2204 can move up or down to some controlled extent in the water 2202.

Figure 24:
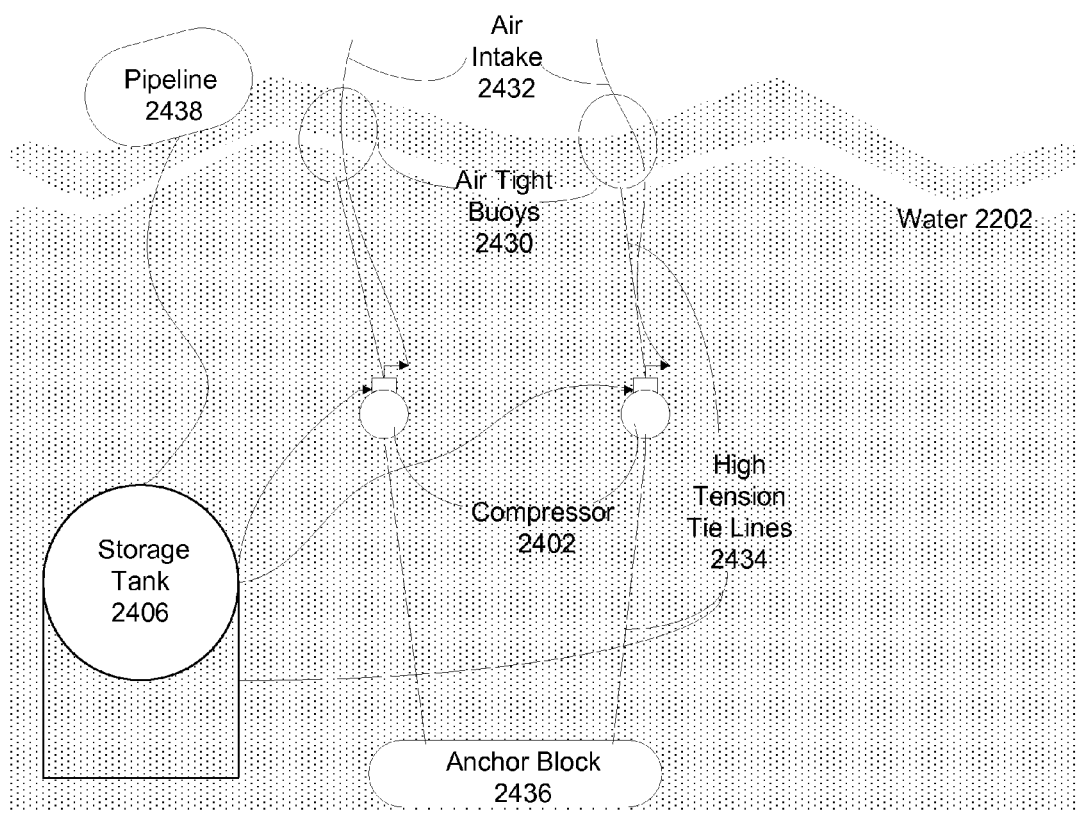
FIG. 24 illustrates a number of compressors in a body of water, in accordance with one embodiment of the invention.

FIG. 24 illustrates a number of compressors in a body of water, in accordance with one embodiment of the invention. For clarity, FIG. 24 is not drawn to scale. In a body of water 2202 (e.g., an ocean, lake, or river), a number of compressors 2402 (e.g., compressor modules as previously disclosed, push/pull high pressure air pumps, commercially available pumps, or equivalents) are connected to air-tight buoys 2430, which support air intakes 2432 that replenish the air in each compressor 2402. High-tension tie lines 2434 and an anchor block 2436 hold each compressor 2402 in position. High-pressure air is obtained from the compressors 2402 and a storage tank 2406 receives the high-pressure air and stores it until a pipeline 2438 can collect the high-pressure air from the storage tank 2406. The high-pressure air would be used later to generate energy in a power module (not shown) on land or in the water. In various embodiments of the invention, each compressor 2402 is positioned at a fixed location in the water 2202, or alternatively can move up or down to some controlled extent in the water 2202, as needed to obtain high-pressure air from the motion of the water 2202 (e.g., from tidal variations, wave motion, or variable water currents).

Figure 25:
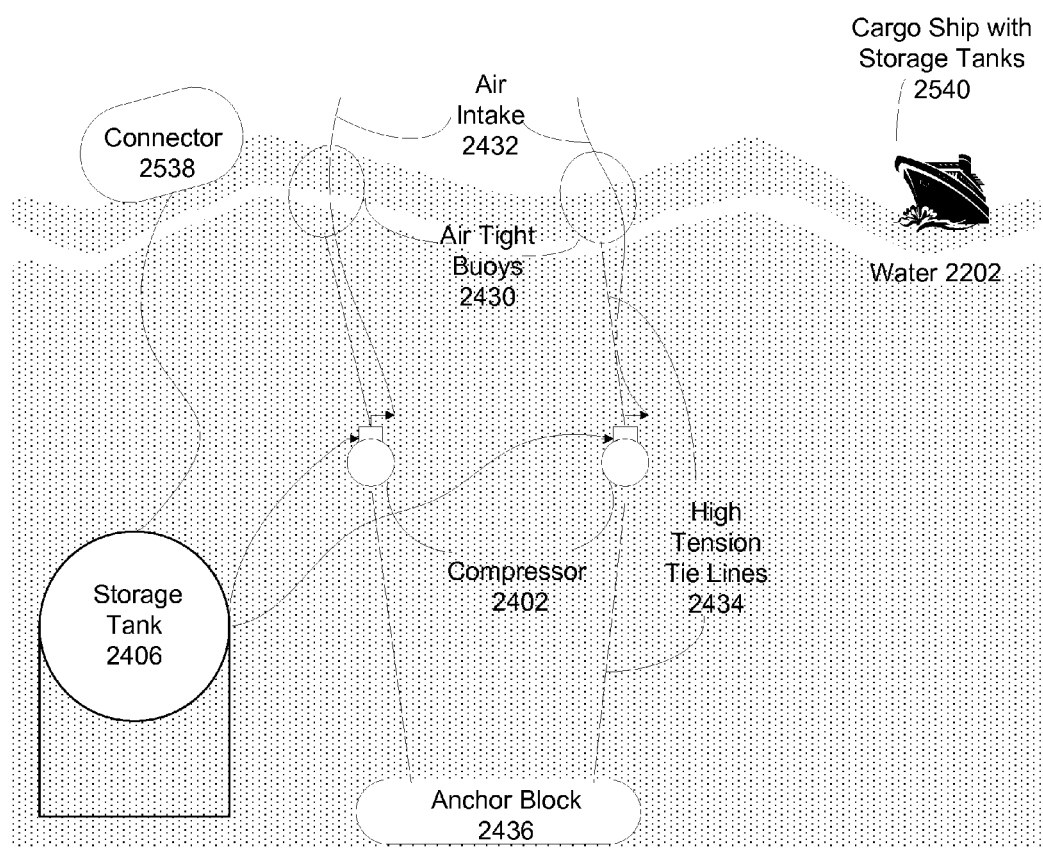
FIG. 25 illustrates a number of compressors in a body of water, in accordance with one embodiment of the invention.

FIG. 25 illustrates a number of compressors in a body of water, in accordance with one embodiment of the invention. For clarity, FIG. 25 is not drawn to scale. In a body of water 2202 (e.g., an ocean, lake, or river), a number of compressors 2402 (e.g., compressor modules as previously disclosed, push/pull high pressure air pumps, commercially available pumps, or equivalents) are connected to air-tight buoys 2430, which support air intakes 2432 that replenish the air in each compressor 2402. High-tension tie lines 2434 and an anchor block 2436 hold each compressor 2402 in position. High-pressure air is obtained from the compressors 2402 and a storage tank 2406 receives the high-pressure air and stores it until a cargo ship 2540 with storage tanks arrives to collect the air through connector 2538 from the storage tank 2406. The high-pressure air would be used later to generate energy in a power module (not shown) in the cargo ship or on land. In various embodiments of the invention, each compressor 2402 is positioned at a fixed location in the water 2202, or alternatively can move up or down to some controlled extent in the water 2202, as needed to obtain high-pressure air from the motion of the water 2202 (e.g., from tidal variations, wave motion, or variable water currents).

Several embodiments of the invention are possible. The phrase "in one embodiment" used in the specification can refer to a new embodiment, a different embodiment disclosed elsewhere in the application, or the same embodiment disclosed earlier in the application. The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to produce energy from the compression of at least one working fluid, said method comprising:
    compressing at least one working fluid to produce a pressurized working fluid in a compressor module;
    storing the pressurized working fluid in at least one storage module for storage of the pressurized working fluid;
    releasing a portion of the pressurized working fluid from the at least one storage module through at least one power module;
    converting a mechanical energy from a moving pressurized working fluid into a rotational energy; and
    generating a usable form of energy from the at least one power module by a motion of the portion of the pressurized working fluid, wherein the at least one power module can generate a usable form of energy from a source of energy and a means of converting the source of energy into a rotation of at least one turbine disk having a plurality of magnets in the at least one power module, wherein the at least one turbine disk has a plane of rotation and the at least one power module has a plurality of EMF coils each having a center axis in proximity to the plurality of magnets in the at least one turbine disk, with the center axis of each EMF coil substantially perpendicular to the plane of rotation of the at least one turbine disk.

2. The method of claim 1, wherein the power module includes at least one turbine disk having a circumference with a plurality of grooves capable of at least 70% energy conversion efficiency in converting the kinetic energy of the pressurized working fluid into rotational energy of the at least one turbine disk.

3. The method of claim 1, wherein the at least one working fluid is water from a body of water and the pressurized working fluid is air.

4. The method of claim 1, wherein the at least one working fluid and the pressurized working fluid are both atmospheric air in composition.

5. The method of claim 1, wherein the at least one working fluid and the pressurized working fluid are different fluids.

6. The method of claim 1, wherein the motion of the at least one working fluid is at least partially induced by the compression of a plurality of floor modules when at least one person walks over the plurality of floor modules.

7. The method of claim 1, wherein the compressor module is located in a body of water and a motion of the body of water compresses a working fluid.

8. The method of claim 1, wherein the pressurized working fluid is also selectively coupled directly to the at least one power module.

9. A method to produce energy from the compression of at least one working fluid, said method comprising:
   converting the motion of a fluid into a rotational energy, wherein the rotational energy is coupled to a compressor module with at least one working fluid and a compressor to compress the at least one working fluid;
   compressing the at least one working fluid in the compressor module to produce a pressurized working fluid;
   storing the pressurized working fluid in at least one storage module for storage of the pressurized working fluid;
   releasing a portion of the pressurized working fluid through at least one power module, wherein the at least one power module can generate a usable form of energy; and
   generating a usable form of energy from a source of energy and a means of converting the source of energy into a rotation of at least one turbine disk having a plurality of magnets in the at least one power module by a motion of the portion of the pressurized working fluid, wherein the at least one turbine disk has a plane of rotation and the at least one power module has a plurality of EMF coil assemblies each having a center axis in proximity to the plurality of magnets in the at least one turbine disk, with the center axis of each EMF coil substantially perpendicular to the plane of rotation of the at least one turbine disk.

10. The method of claim 9, wherein the power module includes at least one turbine disk having a circumference with a plurality of grooves capable of at least 70% energy conversion efficiency in converting the kinetic energy of the pressurized working fluid into rotational energy of the at least one turbine disk.

11. The method of claim 9, wherein the motion of the fluid is at least partially induced by the compression of a floor module when a weight is placed on the floor module.

12. The method of claim 9, wherein the fluid and the working fluid are both atmospheric air in composition.

13. The method of claim 9, wherein the fluid and the working fluid are different fluids.

14. The method of claim 9, wherein the motion of the fluid is at least partially induced by the compression of a plurality of floor modules when at least one person walks on top of the plurality of floor modules.

15. The method of claim 9, wherein converting the motion of a fluid into a rotational energy includes utilizing at least one windmill.

16. A system to produce energy from the compression of at least one working fluid, comprising:
   a compressor module with at least one working fluid with means to compress the at least one working fluid to produce a pressurized working fluid by utilizing a motion of a fluid;
   a storage module for storage of the pressurized working fluid produced by the compressor module; and
   a power module to generate a usable form of energy from a source of energy and a means of converting the source of energy into a rotation of at least one turbine disk having a plurality of magnets by releasing a portion of the pressurized working fluid through the at least one power module, wherein the at least one turbine disk has a plane of rotation and the at least one power module has a plurality of EMF coils each having a center axis in proximity to the plurality of magnets in the at least one turbine disk, with the center axis of each EMF coil substantially perpendicular to the plane of rotation of the at least one turbine disk.

17. The system of claim 16, wherein the power module includes at least one turbine disk having a circumference with a plurality of grooves capable of at least 70% energy conversion efficiency in converting the kinetic energy of the pressurized working fluid into rotational energy of the at least one turbine disk.

18. The system of claim 16, wherein the motion of the fluid is partially induced by the compression of a floor module when a weight is placed on the floor module.

19. The system of claim 16, wherein the fluid and the working fluid are both atmospheric air in composition.

20. The system of claim 16, wherein the fluid and the working fluid are different fluids.

21. The system of claim 16, wherein the motion of the fluid is at least partially induced by the compression of a plurality of floor modules when at least one person walks on top of the plurality of floor modules.

22. The system of claim 16, wherein the compressor module is located in a body of water and a motion of the body of water compresses a working fluid.

23. The system of claim 16, wherein the power module directly produces electrical energy from the rotation of a disk rotated by the motion of the pressurized working fluid.

24. A system to produce energy from the compression of at least one working fluid, comprising:
   a compressor module with at least one working fluid and a compressor to compress the at least one working fluid to produce a pressurized working fluid by utilizing a motion of a fluid;
   a storage module for storage of the pressurized working fluid produced by the compressor module; and
   a power module to generate a usable form of energy from a source of energy and a means of converting the source of energy into a rotation of at least one turbine disk having a plurality of permanent magnets by releasing a portion of the pressurized working fluid through the at least one power module, wherein the at least one turbine disk has a plane of rotation and the at least one power module has a plurality of EMF coils each having a center axis in proximity to the plurality of magnets in the at least one turbine disk, with the center axis of each EMF coil substantially perpendicular to the plane of rotation of the at least one turbine disk.

25. The system of claim 24, wherein the power module includes at least one turbine disk having a circumference with a plurality of grooves capable of at least 70% energy conversion efficiency in converting the kinetic energy of the pressurized working fluid into rotational energy of the at least one turbine disk.

26. The system of claim 24, wherein the motion of the fluid is at least partially induced by the compression of a floor module when a weight is placed on the floor module.

27. The system of claim 24, wherein the fluid and the working fluid are both atmospheric air in composition.

28. The system of claim 24, wherein the fluid and the working fluid are different fluids.

29. The system of claim 24, wherein the motion of the fluid is at least partially induced by the compression of a plurality of floor modules when at least one person walks on top of the plurality of floor modules.

30. The system of claim 24, wherein the power module directly produces electrical energy from the rotation of a disk rotated by the motion of the pressurized working fluid, and wherein the disk is a turbine disk having a plurality of magnet holes for the placement of permanent rare-earth magnets.

\* \* \* \* \*